US008290605B2

(12) United States Patent
Miyazaki et al.

(10) Patent No.: US 8,290,605 B2
(45) Date of Patent: Oct. 16, 2012

(54) ACOUSTIC DESIGN SUPPORT APPARATUS

(75) Inventors: Hideo Miyazaki, Hamamatsu (JP); Takayuki Watanabe, Hamamatsu (JP); Hideki Sakanashi, Fukuroi (JP); Shuichi Matsumoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 328 days.

(21) Appl. No.: 12/784,275

(22) Filed: May 20, 2010

(65) Prior Publication Data

US 2010/0232610 A1 Sep. 16, 2010

Related U.S. Application Data

(62) Division of application No. 11/489,210, filed on Jul. 18, 2006, now Pat. No. 7,773,768.

(30) Foreign Application Priority Data

Jul. 19, 2005 (JP) ................................ 2005-208987
Jul. 19, 2005 (JP) ................................ 2005-208988
Jul. 19, 2005 (JP) ................................ 2005-208989

(51) Int. Cl.
*G06F 17/00* (2006.01)
*G06F 3/16* (2006.01)
*H04R 25/00* (2006.01)
*H04R 1/02* (2006.01)

(52) U.S. Cl. ........... 700/94; 715/727; 381/182; 381/387

(58) Field of Classification Search .................... 700/94; 715/727; 381/58, 59, 182, 186, 386, 387
See application file for complete search history.

(56) References Cited

U.S. PATENT DOCUMENTS

| | | | | |
|---|---|---|---|---|
| 5,467,401 | A | 11/1995 | Nagamitsu et al. | |
| 5,812,674 | A | 9/1998 | Jot et al. | |
| 7,069,219 | B2 | 6/2006 | Meyer et al. | |
| 7,773,768 | B2 | 8/2010 | Miyazaki et al. | |
| 2005/0008165 | A1 | 1/2005 | Sack et al. | |
| 2005/0105744 | A1 | 5/2005 | Lee | |
| 2005/0248726 | A1 | 11/2005 | Read et al. | |
| 2007/0010978 | A1 * | 1/2007 | Crutchfield, Jr. | 703/7 |
| 2007/0185719 | A1 | 8/2007 | Miyazaki | |

(Continued)

FOREIGN PATENT DOCUMENTS

EP 0 593 228 4/1994

(Continued)

OTHER PUBLICATIONS

"Ulysses—Help", IFB Consulting, Apr. 23, 2005, http://www.ifbon.de/software/ulysses/downloads/documents/e.php, p. 30: section 4.4.4.

(Continued)

*Primary Examiner* — Jesse Elbin
(74) *Attorney, Agent, or Firm* — Morrison & Foerster LLP

(57) ABSTRACT

In an acoustic design support apparatus, a speaker selection supporter selects a desired speaker as a candidate for use in a given space based on shape information representing a shape of the space. A speaker mounting angle optimizer calculates an optimal mounting direction of the selected speaker by selecting a mounting direction pattern which minimizes a degree of variation among sound pressure levels at a plurality of positions on a sound receiving surface defined in the space. An acoustic parameter calculator calculates a variety of acoustic parameters at sound receiving points within the space based on both of the shape information of the space and the optimal mounting direction of the speaker.

1 Claim, 15 Drawing Sheets

U.S. PATENT DOCUMENTS

| | | | |
|---|---|---|---|
| 2010/0232611 | A1 | 9/2010 | Miyazaki et al. |
| 2010/0232635 | A1 | 9/2010 | Miyazaki et al. |

FOREIGN PATENT DOCUMENTS

| | | | |
|---|---|---|---|
| EP | 1 355 514 | | 10/2003 |
| JP | 9149500 | | 6/1997 |
| JP | 2002-123262 | A | 4/2002 |
| JP | 2002-366162 | | 12/2002 |
| JP | 2003-016138 | | 1/2003 |
| JP | 2005-049688 | | 2/2005 |

OTHER PUBLICATIONS

Volker Holtmeyer, "Line Array Loudspeaker System Simulation With the Ulusses CAAD Software", Diploma Thesis, Apr. 2005.

Notification of Reasons for Refusal mailed Aug. 16, 2009, for JP Application 2005-208987, with English Translation, five pages.

Notification of Reasons for Refusal mailed Aug. 18, 2009, for JP Application 2005-208989, with English Translation, six pages.

Wolfgang Ahnert et al., "Modern Tools in Acoustic Design of Concert Halls and Theatres—Use and Limitations of Computer Simulation and Auralisation-", XIII Session of the Ressian Acoustical Society, Aug. 25-29, 2003, pp. 863-874 (with English Translation).

Soundvision, www.L-ACOUSTICS.com, L-Acoustics, Apr. 2004, http://www.l-acoustics.com/site-US/techpressna.htm.

Renkus-Heinz (Apr. 16, 2004). EASE 4.1: EASE Software, Version 4.1.0.6, pp. 1-10, 32-33, 66-67, 84-91, 97-98, 177-186, 201-212, 220-223, 269-271, 284-285, 295-305.

Ease® for Windows, Renkus-Heinz—For a Better Sounding World -2006, Renkus-Heinz Inc., 2006, http://renkus-heinz.com/ease/index.html.

Acoustical Performance Partnership, EAW, Loud Technologies, Inc., 2006 http://www.eaw.com/app/index.html.

* cited by examiner

FIG. 1B
| CONVENTION FACILITY NAME | COORDINATES DATA | IMAGE BITMAP |
|---|---|---|
| FAN SHAPE 1 | $(x, y, z)_1$ | 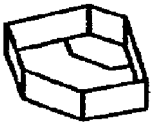 |
| FAN SHAPE 2 | $(x, y, z)_2$ | 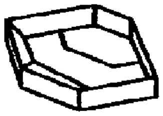 |
| ••• | ••• | ••• |

11B (A) SPACE SHAPE SETTING SCREEN 2

11E

| SHAPE SETTING | | |
|---|---|---|
| STAGE WIDTH m | STAGE HEIGHT m | CONVENTION HALL DEPTH m |
| FAN ANGLE m | CONVENTION HALL HEIGHT m | |

11G

| | |
|---|---|
| 1st FLOOR HEIGHT m | 1st FLOOR SLOPE ANGLE m |
| 2nd FLOOR HEIGHT m | 2nd FLOOR SLOPE ANGLE m |
| 3rd FLOOR HEIGHT m | 3rd FLOOR SLOPE ANGLE m |

CONFIRMATION BUTTON

FIG. 5

12

(A) SPEAKER DISPOSITION SETTING

12A

| USAGE SELECTION | ☑ MUSIC | SPEECH |
|---|---|---|

11E

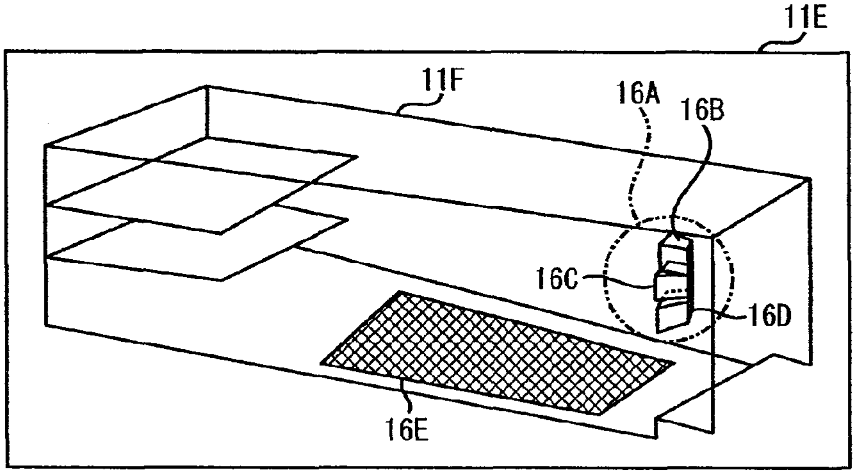

12B

| SHAPE DATA | | |
|---|---|---|
| STAGE WIDTH 10m | STAGE HEIGHT 1.5m | CONVENTION HALL DEPTH 40m |
| FAN ANGLE 120° | CONVENTION HALL HEIGHT 30m | AREA 450m² |

| | |
|---|---|
| 1st FLOOR HEIGHT 10m | 1st FLOOR SLOPE ANGLE 1m |
| 2nd FLOOR HEIGHT 20m | 2nd FLOOR SLOPE ANGLE 1m |
| 3rd FLOOR HEIGHT 30m | 3rd FLOOR SLOPE ANGLE 2m |
| RATIO (W/L) = 0.25 | |

12C

| SPEAKER MOUNTING POSITION | | |
|---|---|---|
| ☑ CENTER | ☐ LEFT | ☐ RIGHT |

16

OPTIMAL SPEAKER CANDIDATES

| | SPEAKER TYPE NAME | AREA SIZE (m²) | USAGE | MOUNTING POSITION | ASPECT RATIO |
|---|---|---|---|---|---|
| ☑ | SPEAKER D | 400-800 | MUSIC | CENTER | (W/L) ≦ 0.6 |
| ☐ | SPEAKER J | 300-750 | MUSIC/SPEECH | CENTER | (W/L) ≦ 0.6 |

FIG. 6

109 SPEAKER DATA TABLE

| SPEAKER TYPE NAME (109A) | AREA SIZE ($m^2$) (109B) | USAGE (109C) | MOUNTING POSITION (109D) | ASPECT RATIO (109E) | INTER-UNIT ANGLE (109F) |
|---|---|---|---|---|---|
| SPEAKER A | 300-750 | MUSIC | CENTER | $0.6 < (W/L) \leqq 1.5$ | 60-120/5.0″ INCREMENTS |
| SPEAKER B | 300-750 | MUSIC | CENTER | $1.5 < (W/L)$ | 60-120/5.0″ INCREMENTS |
| SPEAKER C | 400-800 | MUSIC | LEFT/RIGHT | $(W/L) \leqq 1$ | 30-60/2.5″ INCREMENTS |
| SPEAKER D | 400-800 | MUSIC | CENTER | $(W/L) \leqq 0.6$ | 30-60/2.5″ INCREMENTS |
| SPEAKER E | <400 | MUSIC | LEFT/RIGHT | - | - |
| SPEAKER F | 300-750 | MUSIC/SPEECH | CENTER | $0.6 < (W/L) \leqq 1.5$ | 30-90/5.0″ INCREMENTS |
| SPEAKER G | 300-750 | MUSIC/SPEECH | CENTER | $1.5 < (W/L)$ | 30-90/5.0″ INCREMENTS |
| SPEAKER H | 750< | MUSIC/SPEECH | CENTER | $0.6 < (W/L) \leqq 1.5$ | 30-90/5.0″ INCREMENTS |
| SPEAKER I | 750< | MUSIC/SPEECH | CENTER | $1.5 < (W/L)$ | 30-90/2.5″ INCREMENTS |
| SPEAKER J | 300-750 | MUSIC/SPEECH | CENTER | $(W/L) \leqq 0.6$ | 30-90/2.5″ INCREMENTS |

ACOUSTIC DESIGN SUPPORT APPARATUS

CROSS-REFERENCE TO RELATED APPLICATIONS

This application is a division of U.S. patent application Ser. No. 11/489,210, filed Jul. 18, 2006, the entire disclosure of which is incorporated by reference herein.

BACKGROUND OF THE INVENTION

1. Technical Field of the Invention

The present invention relates to an apparatus and program for supporting acoustic design of acoustic facilities.

2. Description of the Related Art

A variety of design support apparatuses or programs have been suggested for use in designing acoustic equipment in a convention facility such as a music hall or a conference center (see Patent References 1-4). These apparatuses or programs preferably display acoustic characteristics of a speaker sound receiving surface or a sound receiving surface for short, where seats or the like receiving sounds from speakers mounted in a music hall or the like are positioned, on a display device based on characteristics of a selected acoustic system before installing the acoustic equipment at the site so that the displayed acoustic characteristics can be reflected in selection of the acoustic system or in acoustic adjustment of the site.

Patent Reference 1 describes an apparatus that previously produces data of impulse responses of positions around a speaker and automatically calculates sound image localization parameters based on the produced data. In this patent reference, a template is prepared by performing FFT on the impulse responses.

Patent Reference 2 describes an acoustic system design support apparatus that automates equipment selection and design processes through a GUI.

Patent Reference 3 describes an automatic sound image localization parameter calculation apparatus that is used to obtain desired sound image localization parameters.

Patent Reference 4 describes an acoustic adjustment apparatus that automatically adjusts acoustic frequency characteristics in a short time using the difference between the characteristics of sound signals from speakers at the site and the characteristics of the sound signals received by microphones.

In addition, a design support program has been put into practical use, which calculates the number of required speakers, directions of speakers, and level balance, equalizer, and delay parameters of a sound receiving surface area using an input sectional surface shape of a music hall or the like for a planar line array rather than a 3-dimentional array in a process of preparing for acoustic equipment such as speakers.

[Patent Reference 1] Japanese Patent Application Publication No. 2002-366162

[Patent Reference 2] Japanese Patent Application Publication No. 2003-16138

[Patent Reference 3] Japanese Patent Application Publication No. 09-149500

[Patent Reference 4] Japanese Patent Application Publication No. 2005-49688

Any apparatus or program, which displays specific speaker product name candidates, has not been disclosed although apparatuses, which support speaker selection and disposition, have been suggested. Thus, to prepare a speaker, it is necessary to search a catalog for candidates that satisfy given conditions.

Any prior art document, which specifically describes determining and displaying directions in which selected speakers are to be mounted, has not been disclosed although some documents have disclosed a method or apparatus for simulating mounting of selected speakers to determine frequency characteristics of the speakers. Thus, designers themselves must repeat such simulations by trial and error to obtain optimal directions of speakers, so that they usually have trouble in designing angle conditions of speakers.

In addition, all data is not produced in frequency domain in a process of calculating a variety of acoustic parameters of sound receiving points. Thus, to align time axes of various data, it is necessary to perform a plurality of FFT or inverse FFT calculations in a process of calculating the variety of acoustic parameters, thus taking a lot of calculation time. For this reason, this method is not suitable for design that requires a lot of trial and error taking into consideration a variety of combinations of dispositions of speakers.

In Patent Reference 1, certainly, a template including Fast-Fourier-Transformed (hereafter "FFTed") impulse responses is prepared and calculation is performed in the frequency domain. However, when time delay or attenuation due to the distances between speakers and sound receiving points are taken into consideration, responses of a plurality of speakers are summed in the time domain after being inversely FFTed to align the time axes and the data is then again FFTed. If the data is inversely FFTed to convert it to time-domain data when the time delay is great, the amount of the data is increased accordingly. This increases the calculation time of FFT, which takes a lot of calculation time, since the amount of data to be FFTed is increased.

Speakers disposed in a music hall or the like are mostly arranged into an array speaker, which combines speaker units having a plurality of orientations. Although there are such specific speaker shapes, the above patent references do not provide any specific suggestion or description about how to optimize mounting angles of the array speaker and angles between the speaker units in order to make uniform the frequency characteristics of sound pressure levels of the sound receiving surface or the distribution of the sound pressure levels.

In the related art, there is no technology for easily and automatically presenting and arranging detailed options of speakers suitable for the space shape information. The sound receiving surface is only planar as described above. In the related art, there is no technology for automatically displaying an easy-to-see three-dimensional disposition of the speaker in the space. In Patent Reference 1, CAD data is necessary for the speaker selection. It is not easy to collect the CAD data.

SUMMARY OF THE INVENTION

Therefore, the present invention has been made in view of the above problems, and it is an object of the present invention to automate condition setting of an acoustic design support apparatus and program and also to increase the speed of simulation, thereby achieving an efficient and reduced design process and also reducing adjustment at the site.

It is another object of the present invention to provide an acoustic design support apparatus and program that optimizes mounting angles of an array speaker.

It is a further object of the present invention to provide an acoustic design support apparatus and program, whereby it is possible to easily set the shape of a space for disposing a speaker without inputting CAD data and also to automatically present specific speaker candidates.

In order to solve the above problems, the present invention provides an acoustic design support apparatus as described below. Namely, the inventive acoustic design support apparatus comprises: a speaker selection supporter that selects a desired speaker as a candidate for use in a given space based on shape information representing a shape of the space; a speaker mounting angle optimizer that calculates an optimal mounting direction of the selected speaker by selecting a mounting direction pattern which minimizes a degree of variation among sound pressure levels at a plurality of positions on a sound receiving surface defined in the space; and an acoustic parameter calculator that calculates a variety of acoustic parameters at sound receiving points within the space based on both of the shape information of the space and the optimal mounting direction of the speaker.

In the acoustic design support apparatus according to the present invention, when the space shape information is input, the speaker selection supporter automatically selects speaker candidates, and the speaker mounting angle optimizer automatically optimizes the speaker mounting angle, thereby significantly reducing the amount of work required for an acoustic designer to repeat condition setting and simulation by trial and error. Accordingly, the acoustic design support apparatus achieves an efficient and reduced design process and also achieves a reduced adjustment process at the site.

In the calculation of the acoustic parameters in the present invention, the sum of squares of specific data values of specific frequencies of sound or the sum of weighted squares thereof can be used as a substitute for the sound pressure level. The variance of the sums of the squares or the standard deviation thereof can be used as an indicator of the degree of variation among the sound pressure levels. The same is true in the following.

Preferably, the acoustic parameter calculator calculates the acoustic parameters from a response at each sound receiving point, the response being obtained by a convolution-based calculation of speaker characteristics data, equalizer characteristics data and filter characteristics data in a frequency domain, wherein the speaker characteristics data is previously produced through Fourier transform of data of actually measured values of impulse responses in all directions of the speaker, the equalizer characteristics data is previously produced through Fourier transform of data of an equalizer used to adjust frequency characteristics of the speaker, and the filter characteristics data is previously produced through Fourier transform of filter data for phase correction due to a time delay and filter data for attenuation correction due to an attenuation, the time delay and the attenuation being caused by a distance between the sound receiving point and a sound source point defined in the space.

According to the present invention, the acoustic parameter calculator calculates acoustic parameters from responses of sound receiving points, calculated through a frequency-domain calculation, based on data including data of characteristics of speakers previously produced through Fourier transform of data of actually measured values of impulse responses of all directions of a variety of speakers used in acoustic design; data produced through Fourier transform of equalizer filter data used to adjust frequency-domain characteristics of the speakers; characteristics data produced through Fourier transform of filter data for phase correction due to a time delay and filter data for attenuation correction, the time delay and the attenuation being caused by the distance between a sound source point and a sound receiving point; and data obtained through a convolution-based calculation of the characteristics data of the speakers, the data produced through Fourier transform of the equalizer filter data, and the characteristics data produced through Fourier transform of the filter data for phase correction and the filter data for attenuation correction. Accordingly, there is no need to perform inverse FFT and then to perform addition of data on the time axis for achieving phase matching even if a plurality of speakers are present since Fourier transformed characteristics data is used for the filter data for phase correction and the filter data for attenuation correction. In addition, acoustic parameters can be calculated at a high speed since all the parameters are calculated in the frequency domain.

Preferably, the acoustic parameter calculator calculates the acoustic parameters which represent at least one of characteristics of sound pressure levels of the sound receiving surface, a distribution of the sound pressure levels along the sound receiving surface, and impulse responses of the sound receiving surface. The acoustic design support apparatus further comprises a data output unit that outputs the calculated acoustic parameters to a display connected to the acoustic design support apparatus.

In this configuration, the acoustic parameter calculator can calculate the frequency characteristics and the sound pressure distribution, and the data display unit can display the calculated acoustic parameters, so that the acoustic parameters can be visually checked.

The inventive acoustic design support apparatus is designed for calculating optimal mounting angles of a plurality of speaker units included in an array speaker for use in a given space. The inventive apparatus comprises: a pattern setter that sets a plurality of mounting angle patterns, each mounting angle pattern corresponding to a combination of specific mounting angles of the speaker units; a sound pressure level variation degree calculator that performs, for each of the set mounting angle patterns, an axis point position calculation process for calculating positions of axis points at which a sound receiving surface defined in the space intersects axis lines of the speaker units at the specific mounting angles, an equalizer parameter calculation process for determining equalizer parameters of the speaker units which minimize a degree of variation among frequency characteristics of sound pressure levels at the axis points, and a sound pressure level variation degree calculation process for obtaining a degree of variation among the sound pressure levels at a plurality of positions previously set on the sound receiving surface based on the determined equalizer parameters and frequency characteristics of each speaker unit; and a pattern selector that selects one of the set mounting angle patterns, which minimizes the degree of variation of the sound pressure levels at the plurality of the positions, as an optimal mounting angle pattern which determines the mounting angles of the speaker units of the array speaker.

The present invention selects an angle pattern which minimizes the degree of variation among the sound pressure levels of the points on the sound receiving surface. This ensures that the sound pressure levels of the entire sound receiving surface can be made uniform. The present invention does not instantly perform the calculation of the degree of variation, but previously obtains equalizer parameters that optimize the frequency characteristics of sound pressure levels of axis points that are positioned at the ends of center lines (i.e., axis lines) parallel to the direction of radiation of sounds from the speaker. This ensures that the sound pressure levels of the entire sound receiving surface and the frequency characteristics thereof can be made uniform in a shorter time and more efficiently. In most conventional methods, condition setting is manually performed and parameters are changed to repeat simulations. However, using these ad hoc trial and error methods, it will be difficult to achieve the same optimal values as achieved by the present invention even if a very long time is consumed.

In the calculation of the sound pressure levels, for example, the sum of squares of gain values of specific frequencies of each point on the sound receiving surface or the sum of weighted squares thereof can be used as a substitute for the sound pressure level at each point. Here, the specific frequencies may be different from channel frequencies of a parametric equalizer. For example, the degree of variation can be calculated by calculating the variance or standard deviation of the sums of the substitutes for the sound pressure levels at the points on the sound receiving surface.

The inventive acoustic design support apparatus repeatedly activates the pattern setter, the pressure level variation degree calculator, and the pattern selector in an iterative manner, wherein the pattern setter sets the plurality of the mounting angle patterns at intervals of a coarse angle in a first iterative loop, and resets a plurality of fine mounting angle patterns in a second iterative loop at intervals of a fine angle around at least one mounting angle pattern providing a small degree of variation of the sound pressure levels among the plurality of the mounting angle patterns set in the first iterative loop, and wherein the pattern selector selects one of the fine mounting angle patterns providing a minimum degree of variation of the sound pressure levels from among the plurality of the fine mounting angle patterns reset in the second iterative loop, as an optimal mounting angle pattern of the speaker units of the array speaker.

This apparatus according to the present invention initially sets patterns at intervals of a coarse angle and decreases the range of angles of the finely reset mounting angle pattern, thereby efficiently searching for the optimal angle pattern in a short time. If the patterns are set at intervals of a small angle from the beginning to search for the optimal angle pattern without using the present invention, the number of patterns, which are angle combinations, is increased, so that the calculation may be impossible in terms of calculation costs.

Preferably, the sound pressure level variation degree calculator performs the equalizer parameter calculation process including: setting equalizer gain patterns corresponding to combinations of gain setting levels of the speaker units at each channel frequency of an equalizer used to control frequency characteristics of sound signals fed to the speaker units; and calculating, independently for each channel frequency, the equalizer parameters of the speaker units by selecting one equalizer gain pattern from among the set equalizer gain patterns, the selected equalizer gain pattern minimizing a degree of variation of the gains at the respective axis points of the speaker units.

This apparatus according to the present invention defines patterns of parameters which are combinations of equalizer levels and automatically searches these patterns for a combination that provides a small degree of variation among axis points of the speakers. This makes it easy to obtain the optimal equalizer parameters under the angle pattern condition. The present invention does not search for the pattern on an ad hoc basis, but instead defines patterns of parameters for each channel frequency of the equalizer and selects a pattern that minimizes the degree of variation, among the axis points, of the gains of the frequency. This makes it possible to obtain the optimal value in a shorter time.

The degree of variation may be, for example, the absolute value of the variance or standard deviation of the sums of gain values of the axis points, calculated from the frequency characteristics at the axis points, where the number of gain values to be summed for each axis point is equal to the number of the speaker units.

In a practical form, the inventive acoustic design support apparatus comprises: a speaker selection data storage that previously stores a data table in which a variety of speaker data representing characteristics of speakers are written; a space shape input unit that receives shape information inputted to select a schematic shape of a space and numerical information inputted to specify characteristics of the schematic shape; and a speaker selection supporter that selects a speaker as a candidate for use in the space, based on the shape information and the numerical information inputted through the space shape input unit by comparing the inputted shape information and the numerical information with the speaker data of the data table of the speakers, and that outputs the candidate to a display connected to the acoustic design support apparatus.

In the apparatus according to the present invention, through the space shape input unit, it is possible to select a schematic shape of a space for disposing a speaker without inputting CAD data and then to input numerical values regarding information of the selected shape. This makes it easy to set the space shape. The speaker selection data storage stores the data table containing a variety of data used to select a specific speaker. With reference to this data, it is possible to select speaker candidates that can be used, so that it is possible to automatically present specific speaker candidates.

Preferably, the space shape input unit receives the space information specifying either of a fan shape and a box shape as the schematic shape of the space.

In this configuration, it is possible to select a fan or box shape, which is an exemplary shape of an acoustic facility or the like. With only the acoustic design support apparatus, shape conditions can be easily input to allow acoustic design without inputting CAD data.

Preferably, the data table is written with at least an allowable range of an area size of the space for each speaker and an allowable range of a planar shape aspect ratio of the space for each speaker. The speaker selection supporter calculates an area size and a planar shape aspect ratio of the space based on the shape information and the numerical information inputted through the space shape input unit, and determines whether or not the calculated area size and planar shape aspect ratio correspond to the allowable range of the area size of the space for each speaker and the allowable range of the planar shape aspect ratio of the space for each speaker so as to select the speaker which meets the allowable ranges.

In this configuration, the speaker selection supporter calculates the area size of the space, and the data table stores data of space area sizes that can be calculated from output limits of speakers determined from allowable inputs and efficiencies of the speakers, and with reference to this data, it is possible to narrow down the selection of speakers that can be used. Although the planar shape aspect ratio of the speaker is restricted by the distance from the speaker calculated from the output of the speaker and the orientation thereof, it is possible to narrow down the selection of speakers that can be used with reference to the data of the data table. It is also possible to calculate specific speaker candidates by determining whether or not the calculated area size and planar shape aspect ratio correspond to the allowable ranges.

The present invention automates condition setting of the acoustic design support apparatus and program, and increases the speed of simulation, thereby achieving an efficient and reduced design process and also reducing adjustment at the site.

The present invention makes the sound pressure levels of the entire sound receiving surface and the frequency characteristics thereof uniform. The present invention does not instantly perform the calculation of the degree of variation but previously obtains equalizer parameters that optimize the frequency characteristics of sound pressure levels of axis points that are positioned at the ends of center lines (i.e., axis lines) parallel to the direction of radiation of sounds from the speaker. This ensures that the sound pressure levels of the entire sound receiving surface and the frequency characteristics thereof can be made uniform in a shorter time and more efficiently.

According to the present invention, it is possible to select a schematic shape of a space for disposing a speaker without inputting CAD data and then to input numerical values regarding dimensional information of the selected shape. This makes it easy to set the space shape. It is also possible to automatically present specific speaker candidates.

BRIEF DESCRIPTION OF THE DRAWINGS

FIG. 1B shows a data structure of basic convention facility shapes in this embodiment.

FIG. 5 illustrates an example of a GUI for performing speaker selection and disposition display.

FIG. 6 illustrates a data structure of a speaker selection table.

DETAILED DESCRIPTION OF THE INVENTION

Figure 1A:
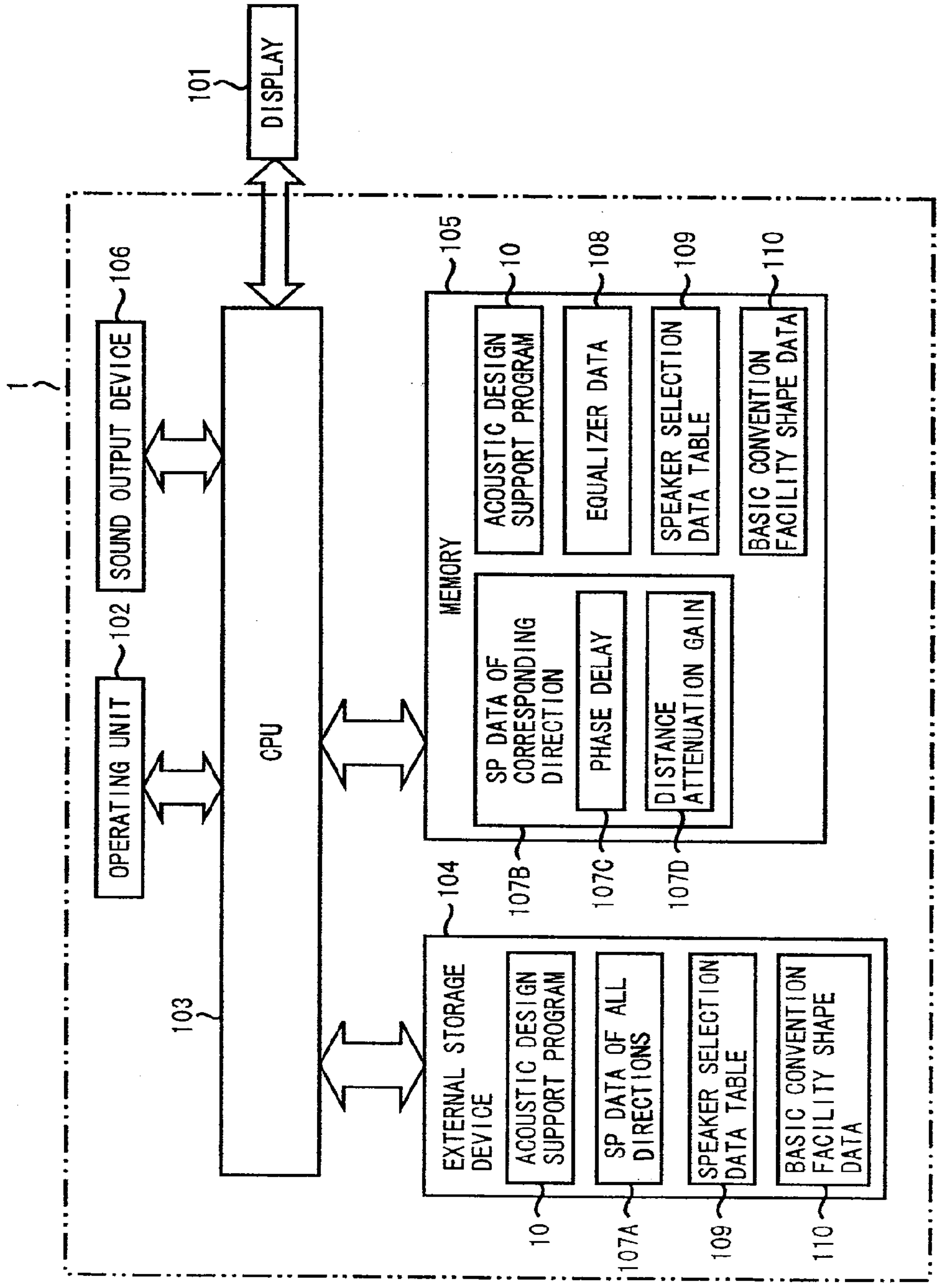
FIG. 1A illustrates an internal configuration of an acoustic design support apparatus.

An internal configuration of an acoustic design support apparatus according to an embodiment of the present invention will now be described with reference to FIG. 1. FIG. 1 illustrates an internal configuration of an acoustic design support apparatus and a data structure of data of basic convention facility shapes in this embodiment. The acoustic design support apparatus 1 supports selection or setting of acoustic equipment such as a speaker in a convention facility such as a hall or a conference center. The acoustic design support apparatus 1 simulates a sound field when a sound is output and displays the simulation results. As shown in FIG. 1A, the acoustic design support apparatus 1 includes a computer or the like and a program installed on the computer or stored in a fixed memory. Specifically, the acoustic design support apparatus 1 includes an operating unit 102, a CPU 103, an external storage device 104, a memory 105, and an audio output device 106, and outputs simulation results to a display 101 provided outside the acoustic design support apparatus 1. The following is a description of each component of the acoustic design support apparatus 1.

The display 101 in FIG. 1 includes a general-purpose liquid crystal display, which displays screens (see FIGS. 3-5 explained later) for helping to input a variety of setting conditions or displays simulation results. The display 101 is provided outside the apparatus 1 of this embodiment although it is essential to implement this embodiment as described above.

The operating unit 102 in FIG. 1 receives a variety of setting conditions, an instruction to simulate a sound field, an instruction to optimize the speaker arrangement, and an instruction to select a mode for displaying simulation results.

The CPU 103 in FIG. 1 executes a program 10 stored in the external storage device 104, which is described below. The CPU 103 receives an instruction from the operating unit 102 and executes the program in conjunction with the other hardware resources of the acoustic design support apparatus 1.

The external storage device 104 in FIG. 1 includes a machine readable medium such as a hard disk, and stores the program 10, SP data 107 produced through Fast Fourier Transform (FFT) of impulse responses or the like of the surroundings of a speaker, equalizer data 108 suitable for the speaker, a speaker selection table 109 (see FIG. 6 explained later), and basic convention facility shape data 110, which will be described in detail later.

The memory 105 in FIG. 1 temporarily stores data read from the external storage device 104 and exchanges data with the CPU 103.

The user uses the sound output device 106 to audibly confirm a sound field at a specific position of a sound receiving surface, as a simulation result of the acoustic design support apparatus 1, through a headphone, a speaker, or the like (not shown). The sound output device 106 includes a DSP and a D/A converter. The sound output device 106 convolves sound source data (not shown) stored in the external storage device 104 in frequency domain with the SP data 107 described above and outputs the resulting data through a headphone via the D/A converter.

The following is a description of SP data 107A and 107B in FIG. 1. The SP data 107 in FIG. 1 has been previously produced through FFT using a complex function and stored in the external storage device 104. When a calculation is performed, SP data 107B of a direction corresponding to a specific point, which is required for the calculation, is retrieved and loaded into the memory 105. When a response of a sound receiving point is calculated, a transfer delay time can be calculated by calculating a phase delay corresponding to the delay time at each frequency in the frequency domain. Since gain and equalizer data can also be calculated in the frequency domain, it is possible to reduce the time required to perform the step ST2 of calculating simulation data in FIG. 2 that will be described later. Accordingly, acoustic parameters can be calculated from the frequency response obtained through the above calculation and there is no need to take into consideration the response time length, so that there is no need to take into consideration the size of the time domain data to be FFTed. The conventional apparatus performs inverse FFT to match the time domain between the speaker units. Thus, the conventional apparatus has a problem in that, when a delay is added, the amount of data in the time domain is increased and it is necessary to perform additional FFT, which takes a lot of time, on the increased data.

In addition, when a sound field is confirmed through a headphone at step ST3 of FIG. 2, which will be described later, there is a need to change the FFT process length according to the delay length.

Figure 9:
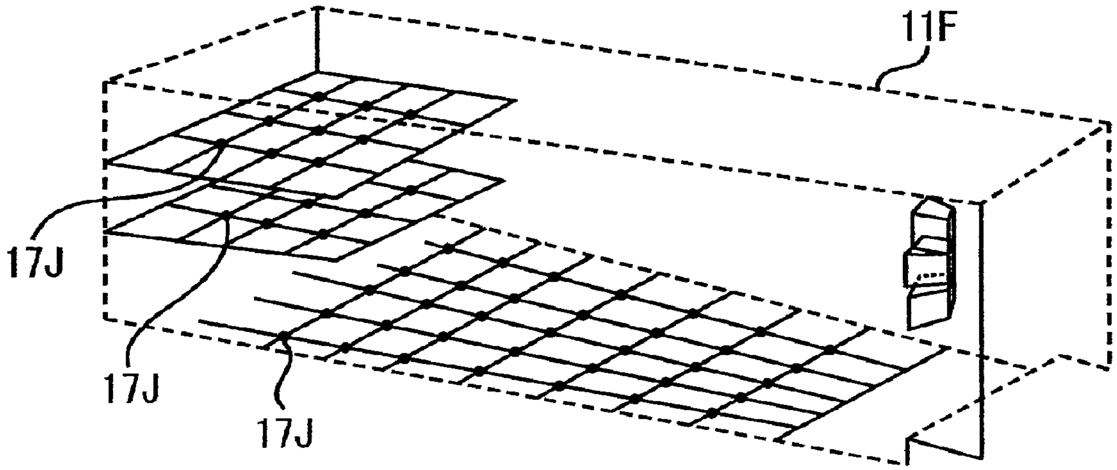
FIG. 9 illustrates an example of a sound receiving surface area divided into lattibe points.

The following is a description of correction filter data 107C and 107D. As shown in FIG. 1, the SP data 107B of the corresponding direction in the memory 105 includes the correction filter data 107C and 107D that is generated and stored during the simulation. Specifically, Fourier transformed time delay phase correction filter data 107C and Fourier transformed distance attenuation correction filter data 107D, which is produced respectively through Fourier transform of filter data for correcting a phase delay caused by the distance between the sound source and the sound receiving point and filter data for correcting attenuation caused by the same, is stored in addition to the impulse response data. During the simulation, the data 107C and 107D is automatically produced through Fourier transform as lattice points are set as shown in FIG. 9 explained later.

The following is a brief description of the equalizer data 108, which will be described in detail later with reference to FIGS. 7 and 8. The equalizer data 108 is obtained by performing Fourier transform of equalizer filter data used to adjust the frequency-domain characteristics of the speaker. The equalizer data 108 is produced and stored in the memory 105 during a simulation or optimization process (see step ST15) in FIG. 2 that will be described later. Specifically, for each speaker unit, the user can adjust and set a gain level of each frequency of a parametric equalizer or the like provided through a GUI shown in the drawings subsequent to FIG. 2 in which its setting method is not shown. This process corresponds to step ST13 in FIG. 2. At step ST17 of FIG. 2, equalizer parameters can be automatically set for each speaker unit through optimization shown in FIGS. 7C and 8 described later. The set equalizer parameters are first converted to impulse response data through a condition setting process of step ST13 of FIG. 2 and, thereafter, the data is FFTed and stored as frequency-domain data.

The following is a brief description of the speaker selection table 109, which will be described in detail later. The speaker selection table 109 is used to automatically select specific speaker candidates when the condition setting of FIGS. 3 and 4 has been done. Data required for this selection has been stored.

Figure 3:
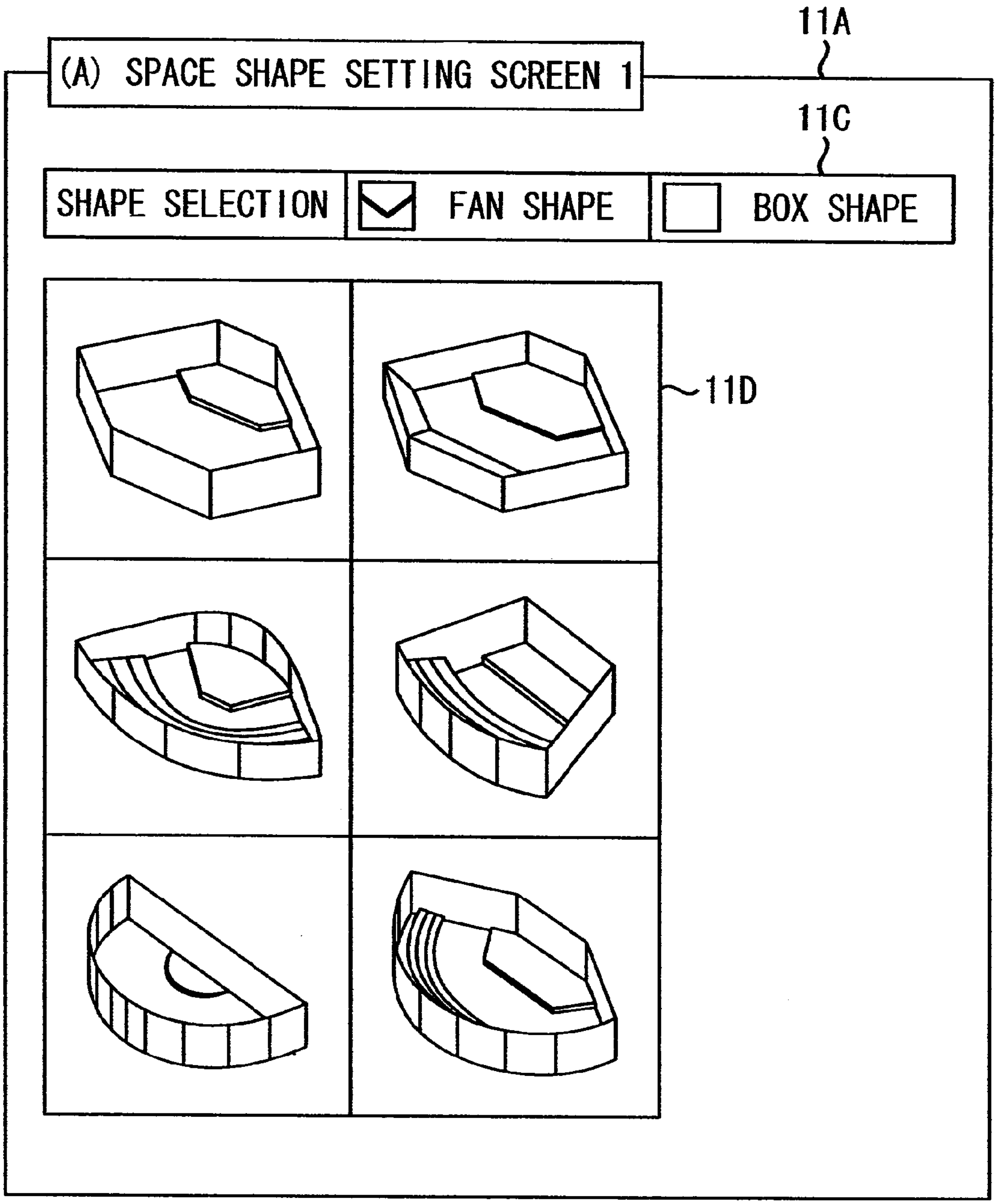
FIG. 3 illustrates an example of a graphical user interface (GUI) for setting a schematic shape of a space accommodating a speaker.

A data structure of the basic convention facility shape data 110 will now be described with reference to FIG. 1B. As shown in FIG. 1B, the basic convention facility shape data 110 includes a plurality of combinations of convention facility names, shape coordinate data, and image bitmaps, which are stored in the external storage device 104 and the memory 105. A shape selection portion 110 in FIG. 3 shows examples of the image bitmaps. This coordinate data also includes setting items of FIG. 4 for setting a convention facility space shape.

In the following description of the apparatus of this embodiment, the term “speaker” is used to describe an array speaker for easier explanation. However, the present invention is not limited to the array speaker.

The overview of the overall process of the acoustic design support apparatus 1 in this embodiment will first be described with reference to FIG. 2. FIG. 2 is an overall flow chart of how the apparatus of this embodiment operates. This flow chart is mainly divided into three steps ST1-ST3.

At step ST1, condition setting is performed to set simulation conditions.

At step ST2, parameter data is calculated, which is data representing display characteristics of simulation results based on this condition setting. The following data is used in this calculation.

The SP data 107A of all directions has been previously stored, which includes data of characteristics of speakers that is previously produced through Fourier transform of data of actually measured values of impulse responses of all directions of a variety of speakers used in the acoustic design as described above.

The equalizer data 108 (in the memory 105), which is produced through Fourier transform of equalizer filter data used to adjust frequency-domain characteristics of speakers, is set by the user or automatically calculated in a simulation process of each unit as described above.

Fourier transformed time delay phase correction filter data 107C and Fourier transformed distance attenuation correction filter data 107D is produced when lattice points are set as shown in FIG. 9 in a simulation process.

As is apparent from the above description, all the data 107A, 107B, 107C, and 107D is maintained as FFTed frequency domain data. Especially, there is no need to perform inverse FFT and then to perform addition on the time axis for achieving phase matching even if a plurality of speakers is present since the phase correction filter data 107C and the distance attenuation correction filter data 107D is maintained in the frequency domain. In addition, acoustic parameters can be calculated at a high speed since all the parameters are calculated in the frequency domain.

At step ST3, a simulation result of this acoustic design support apparatus is output to the display 101 of FIG. 1.

A variety of conditions required for this simulation are set at the condition setting step ST1. The following is a description of how conditions are set at steps ST11-ST14.

At step ST11, a space in which a speaker is to be disposed is set. For example, information of a shape of a convention facility or the like (hereinafter, simply referred to as a “space shape”) is set. Specifically, a schematic shape of the space is selected and numerical values indicating details of the shape are also input, which will be described later with reference to FIGS. 3 and 4. The step ST11 provides a space shape input unit that receives shape information inputted to select a schematic shape of a space and numerical information inputted to specify characteristics of the schematic shape.

At step ST12, a speaker is selected and a position in the space at which the speaker is to be disposed is also set.

At step ST13, disposition conditions of each speaker are set. For example, angles between units of an array speaker are set.

At step ST14, simulation conditions are set, which include a simulation condition as to whether to take into consideration interference between the units and a simulation condition as to how closely lattice points are defined in the sound receiving surface (see FIG. 9 explained later).

Figure 2:
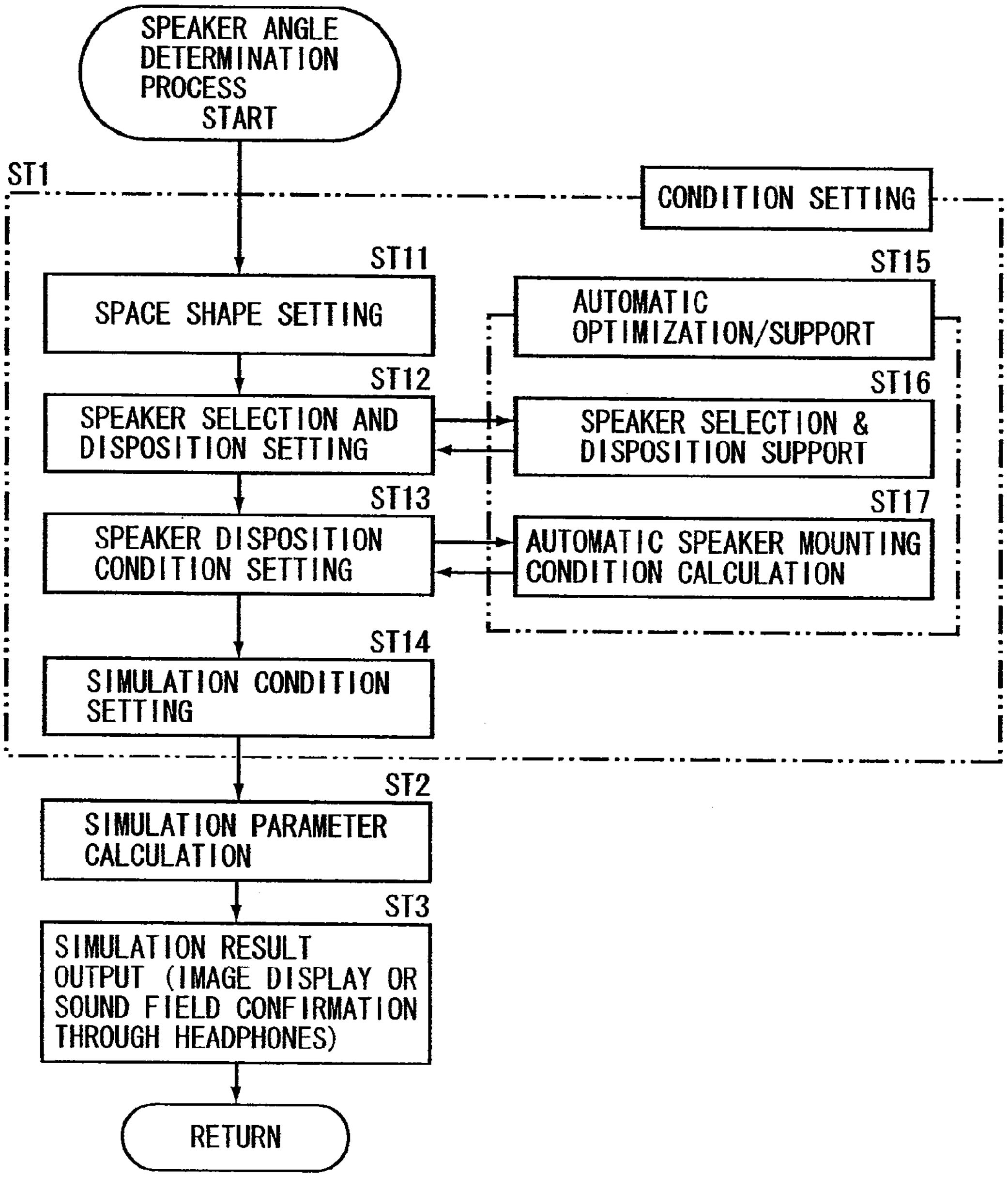
FIG. 2 is an overall flow chart showing how the apparatus of this embodiment operates.

Once all the conditions shown at step ST1 of FIG. 2 are set, a simulation result is displayed on the display 101 through steps ST2 and ST3. Namely, the steps ST2 and ST3 provides a data output unit that outputs the calculated acoustic parameters to the display 101 connected to the acoustic design support apparatus. However, the purpose of performing this simulation is not to display the simulation result on the display 101 but to optimize the conditions of step ST1 shown in FIG. 2 for optimal design of the speaker setting disposition conditions. Thus, the acoustic designer performs the optimization by repeating the procedure of steps ST1-ST3 shown in FIG. 2. However, this procedure requires a lot of effort. Accordingly, at step ST15, the acoustic design support apparatus 1 in this embodiment receives space shape information at step ST1 and performs automatic optimization or support of speaker setting and speaker angle setting. Namely, the step ST15 provides a speaker selection supporter that selects a speaker as a candidate for use in the space, based on the shape information and the numerical information inputted through the space shape input unit by comparing the inputted shape information and the numerical information with the speaker data of the data table of the speakers, and that outputs the candidate to a display connected to the acoustic design support apparatus.

The step ST15 in FIG. 2 associated with the automatic optimization includes steps ST16 and ST17. At step ST16, options of speaker candidates that can be used are displayed on the display 101. If a speaker is selected through the operating unit 102, the appearance of how the speaker is disposed in the space set at step ST1 is displayed on the display 101.

At step ST17, angles (specifically, angles in the horizontal and vertical directions) of the disposed array speaker and an optimal angle combination pattern of angles between units of the speaker are automatically set. Here, the angles of the array speaker are representative angles of an overall orientation axis of the speaker and are specifically angles in the horizontal and vertical directions of the orientation axis of a reference unit of the speaker. The angles between the units are opening angles between adjacent ones of the units of the speaker.

The steps ST11-ST17 of the condition setting step ST1 in FIG. 2 will now be described in detail with reference to the drawings subsequent to FIG. 2. Reference numerals used in the drawings correspond to the step numbers shown in FIG. 2 for easier explanation.

First, the space shape setting step ST11 of FIG. 2 is described with reference to FIGS. 3 and 4. FIG. 3 illustrates an example of a graphical user interface (GUI) for setting a schematic shape of the space for disposing a speaker. As shown in FIG. 3, a space shape setting screen 11A is displayed on the display 101 in FIG. 1 to allow setting of the schematic shape of the space for disposing a speaker. A shape selection portion 11C allows selection of the type of the schematic shape of the space and, specifically, selection of a fan shape and a box shape as shown in FIG. 3. The space shape input unit receives the space information specifying either of a fan shape and a box shape as the schematic shape of the space. For example, when the fan shape is selected in the shape selection portion 11C by marking a check box of the fan shape using a mouse or the like (not shown) of the operating unit 102, a plurality of example fan shapes of acoustic facilities or the like is displayed in a shape selection portion 11D as shown in FIG. 3. In addition, one of the fan shapes in the shape selection portion 11D can be selected using the mouse or the like.

Figure 4:
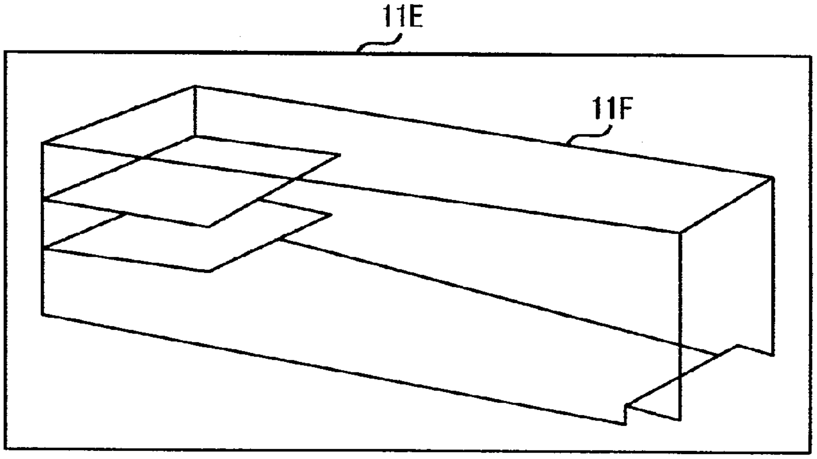
FIG. 4 illustrates an example of a GUI provided to input shape parameters for setting a schematic shape of the space for disposing a speaker.

Once one of the six fan shapes shown in the shape selection portion 11D in FIG. 3 is selected, the space shape setting screen 11A is switched to a space shape setting screen 11B shown in FIG. 4, and a line drawing of a space shape 11F, which corresponds to one of the six space shapes, is displayed in a space shape display portion 11E. FIG. 4 illustrates an example of a GUI provided to input shape parameters for setting a schematic shape of the space for disposing a speaker. The shape selection portion 11D is read from the basic convention facility shape data 110 stored in the external storage device 104 in FIG. 4 and is then output to the display 101.

A shape setting input portion 11G in the space shape setting screen 11B shown in FIG. 4 allows numerical values to be input to set the shape of a space for disposing a speaker and, specifically, allows numerical values to be input to set parameters of the shape thereof such as the width of a platform, the height or depth of an acoustic facility, the height of each step, or the gradient of a slope. If numerical values of the parameters of the shape are changed when the setting is performed, the shape 11F shown by the line drawing is changed according to the change of the numerical values. The shape of the space for disposing a speaker is set on the space shape setting screen. Required data is read from the basic convention facility shape data 110 in the external storage device 104 of FIG. 1 and is then written to the shape setting input portion 11G. For example, if the shape is a fan shape, angles of the fan shape are needed, and if not only a first floor but also second and third floors are present, the necessity of a field to write their shape data is written after it is read from the basic convention facility shape data 110.

If a confirmation button 11H of FIG. 4 is pressed, the screen is switched to a speaker selection and disposition setting screen 12 shown in FIG. 5. FIG. 5 illustrates an example of a GUI for performing the speaker selection and disposition setting, which corresponds to steps ST12 and ST16 in FIG. 1. A usage selection display portion 12A, a space shape display portion 11E, a shape data portion 12B, and a speaker mounting position portion 12C are displayed on the speaker selection and disposition setting screen 12.

A shape having an almost real shape ratio, which is obtained based on the space shape set in FIGS. 3 and 4, is displayed in the space shape display portion 11E shown in FIG. 5.

The usage selection display portion 12A shown in FIG. 5 allows selection of the purpose of using an acoustic facility or the like. Either or both of usages "music" and "speech" can be selected by marking check boxes of the usages "music" and "speech". When the usage "music" is selected, the acoustic design emphasizes, for example, acoustic performance associated with sound quality such as frequency characteristics of sound pressure levels, and when the usage "speech" is selected, the acoustic design emphasizes, for example, acoustic performance associated with voice clarity. This achieves optimal acoustic designs for the different purposes of the acoustic design.

The speaker mounting position portion 12C shown in FIG. 5 allows selection of a position at which a speaker is to be mounted. For example, the center of a stage "center", stage left "left", or stage right "right" can be selected in the speaker mounting position portion 12C in FIG. 5.

Once the acoustic designer selects setting options of the usage selection display portion 12A and the speaker mounting position 12C as shown in FIG. 5 by marking their check boxes using the mouse or the like as described above, the apparatus of this embodiment presents specific optimal speaker candidates. This selection corresponds to the step ST16 of FIG. 2 and is automatically performed by the acoustic design support apparatus 1. Namely, the step ST16 provides a speaker selection supporter that selects a desired speaker as a candidate for use in a given space based on shape information representing a shape of the space.

The optimal speaker candidate can be selected from the speaker selection table 109 in FIG. 1. A data structure of the speaker selection table 109 of FIG. 1 is illustrated in FIG. 6. The external storage device 104 is a speaker selection data storage that previously stores the data table in which a variety of speaker data representing characteristics of speakers are written. The speaker selection table 109 has a data structure that is suitable for selecting the optimal speaker based on the information of the space shape set in FIGS. 3 and 4. The speaker selection table 109 includes speaker type name data 109A, area size data 109B, usage data 109C, mounting position data 109D, and aspect ratio data (or horizontal to vertical ratio data) 109E. The data table 109 is written with at least an allowable range of an area size of the space for each speaker and an allowable range of a planar shape aspect ratio of the space for each speaker. For example, speakers (Speaker D and Speaker J) can be selected from the speaker selection table 109 as shown in an optimal speaker candidate portion 16 in FIG. 5 since an area (specifically, a sound receiving surface area) shown in the shape data 12B is 450 $m^2$ and the check box of "center" is marked in the speaker mounting position portion 12C.

In this manner, the apparatus of this embodiment can automatically display the optimal speaker candidate portion 16 in response to changes in the variety of setting conditions. To select and prepare a speaker, the conventional apparatus requires the designer to refer to a catalogue, which is a task requiring a lot of trouble. However, with the apparatus of this embodiment, the designer only needs to select a speaker from the speaker candidates, thereby efficiently performing acoustic design. This is effective especially when resetting repetitive conditions.

A GUI that displays how an array speaker is disposed will now be described with reference to FIG. 5. If an array speaker is selected from the optimal speaker candidate portion 16 in FIG. 5, then the selected array speaker 16A is displayed on the same reduced scale as that of the space shape 11F. This allows the designer to visually confirm how the array speaker 16A is disposed in the space. Displaying the array speaker 16A also corresponds to the step ST16 of FIG. 2. Once the array speaker 16A is displayed, the procedure terminates the step ST16 of FIG. 2 and returns to step ST12.

If the array speaker 16A shown in FIG. 5 is displayed, a defensive range of the displayed array speaker 16A can be selected. A defensive range 16E set in the example of FIG. 5 corresponds to half of the sound receiving surface of a first floor of the space. Any other part of the space, i.e., one of the entirety of the space, the entirety of the first floor, and the entirety of the second and third floors, can be selected through input in the GUI using the operating unit 102. This selection input corresponds to the step ST12 of FIG. 2. Thereafter, at step ST17 of FIG. 2, condition setting of the angles of the array speaker and the angles between units thereof is performed through the CPU 103 of the acoustic design support apparatus 1.

The step S17 shown in FIG. 2 will now be described with reference to FIGS. 7-10. FIGS. 7A-7E are conceptual diagrams illustrating a method for automatically calculating setting conditions of the angles of the array speaker and the angles between the units. To optimally design the mounting angles of the units of array speaker, the conventional apparatuses need to repeat the simulation shown in FIG. 2 and mostly have no choice but to depend on trial and error processes of the designer. However, the apparatus of this embodiment automatically calculates such setting conditions.

Figure 7A:
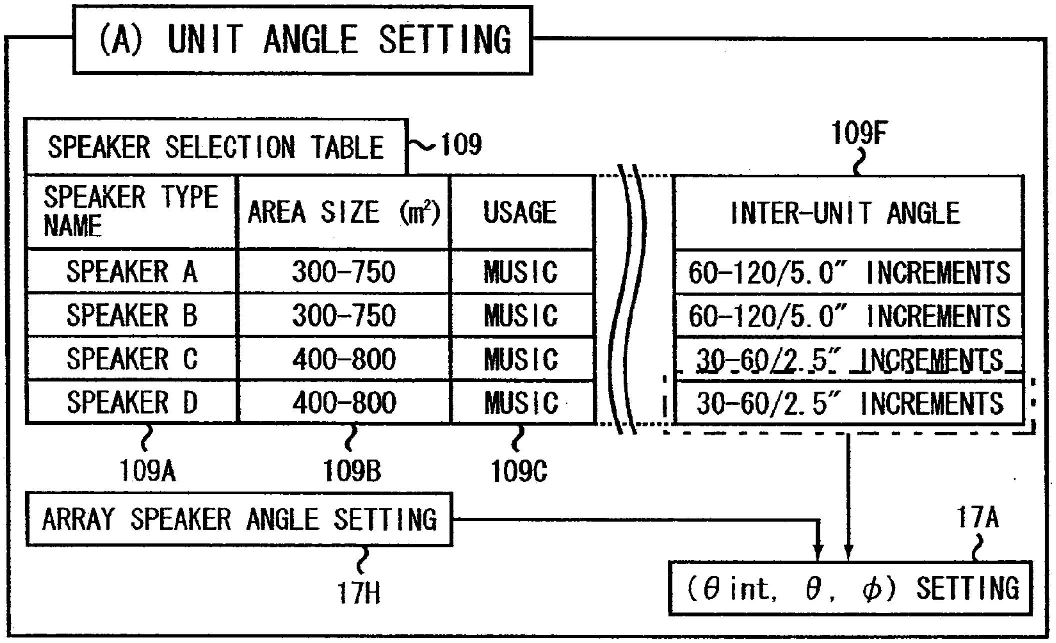
FIGS. 7A-7E are conceptual diagrams illustrating a method for automatically calculating setting conditions of angles between units of an array speaker.
Figure 7B:
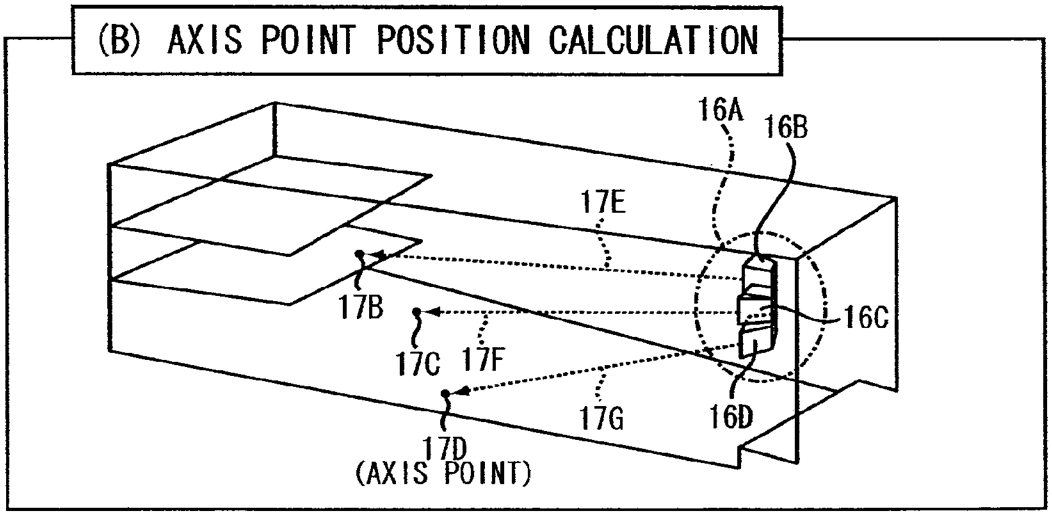
Figure 7C:
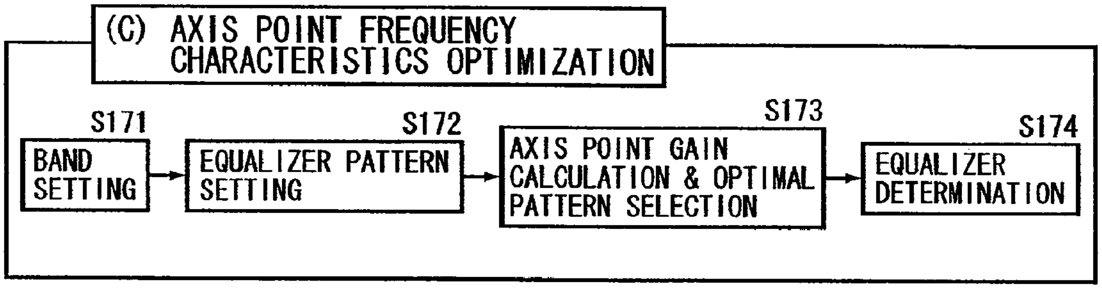
Figure 7D:
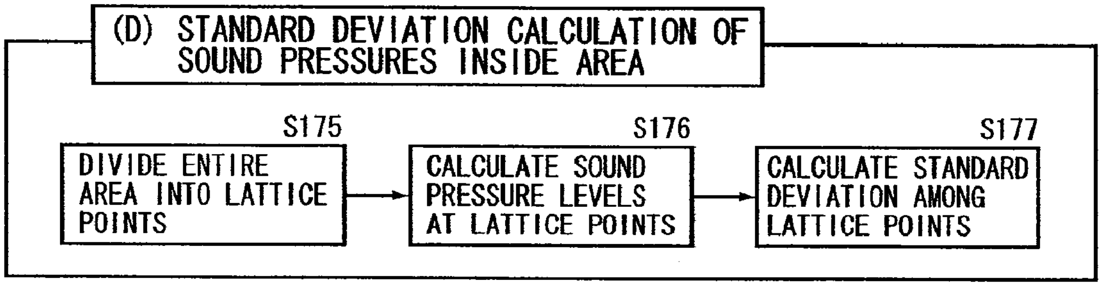

The calculation of the step ST17 of FIG. 2 is divided into five processes of FIGS. 7A-E. First, the purpose of this calculation is to obtain the respective optimal values of angles of the array speaker 16A, which is selected from the optimal speaker candidates 16 in FIG. 6, and inter-unit angles 109F of the array speaker 16A in the speaker selection table 109. Put simply, the purpose of calculating the optimal values is to achieve uniformity and optimization of sound pressure levels in the sound receiving area. A deviation of zero of the sound pressure levels of the entire sound receiving surface is used as an indicator of the optimal angles. Specifically, the optimal angles of the array speaker 16A are angles thereof at which the standard deviation of the sound pressure levels of lattice points set in the entire sound receiving surface as shown in FIG. 7D is minimized. Namely, the step ST17 provides a speaker mounting angle optimizer that calculates an optimal mounting direction of the selected speaker by selecting a mounting direction pattern which minimizes a degree of variation among sound pressure levels at a plurality of positions on a sound receiving surface defined in the space.

However, it is difficult to instantly calculate the standard deviation as shown in FIG. 7D by trial and error in terms of the calculation efficiency since the sound receiving surface is wide and sounds of two or more units may also reach the sound receiving surface. Thus, the apparatus of this embodiment first performs optimization of frequency characteristics of sound pressure levels of axis points 17B, 17C, and 17D at which the sound receiving surface intersects axis lines 17E, 17F, and 17G of the speaker corresponding to the directions of the units of the speaker as shown at the steps of FIGS. 7B and 7C. The processes of FIGS. 7A-7E will now be described in detail.

As shown in FIG. 7A, the angles between the units are selected and set from the inter-unit angles 109F in the speaker selection table 109 shown in FIG. 6. Inter-unit angles are unique to each array speaker. When the array speaker 16A is actually mounted, the inter-unit angles are set using a jig of the array speaker 16A. Let the inter-unit angle be θint. Angles of the mounted array speaker need to be set in the horizontal and vertical directions. Let a combination of the horizontal and vertical angles be (θ, ϕ). Here, the range of the horizontal angle θ is such that $-180°<\theta\leqq 180°$ and the range of the vertical angle ϕ is such that $-90°\leqq\phi\leqq 90°$. The mounting angles of the units of the array speaker are determined from these angles (θint, θ, ϕ). Specifically, in the apparatus of this embodiment, the speaker 16A includes three units 16B, 16C, and 16D, and therefore it is necessary to set two inter-unit angles θint, i.e., a relative angle $\theta int_1$ between the unit 16B and the unit 16C and a relative angle $\theta int_2$ between the unit 16C and the unit 16D.

Figure 7E:
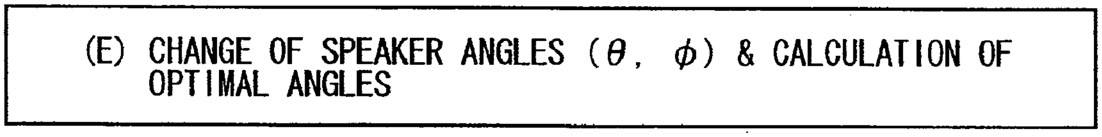

The setting of the angles of the units shown in FIG. 7A is performed such that the angles (θ, ϕ) of the array speaker and the inter-unit angles θint (i=1, 2), at which the indicator described above is minimized, are searched for while changing the angles as shown in FIG. 7E that will be explained later. The increments of the inter-unit angles θint (i=1, 2) are determined from the speaker selection table 109. Initially, the setting 17H of the angles of the mounted array speaker is performed by changing the angles by increments of a large angle in order to reduce the calculation time as described later with reference to FIG. 10.

The following is a description of an example of the number of patterns of the setting angles. For example, the angle increment can be set to 30 degrees. If the speaker D is selected as the speaker type name 109A from the optimal speaker candidate portion 16 as shown in FIG. 6, the angles of the array speaker are changed at intervals of 30 degrees in the ranges of $-180°<\theta\leqq 180°$ and $-90°\leqq\phi\leqq 90°$ as shown in FIG. 7A. In addition, the angles between the units of the array speaker can be changed at intervals of 2.5 degrees in the range of 30 to 60 degrees. Specifically, 180° is selected as the angle θ, 90° is selected as the angle θ, and 60° is selected as the angle θint to perform the setting 17A of the angles (θint, θ, ϕ) as shown in FIG. 7A. In this case, the number of values of the angle θ is 12 since the angle θ changes at intervals of 30 degrees in the range of −180 to 180 degrees and the number of values of the angle ϕ is 7 since the angle ϕ changes at intervals of 30 degrees in the range of −90 to 90 degrees. In addition, the number of values of the angle θint is 13 since the initial settable range of the angle θint is 30 degrees wide (i.e., it ranges from 30 to 60 degrees) and the angle increment thereof is 2.5 degrees in the case of the speaker type D as shown in FIG. 6 (i.e., (60−30)/2.5+1=13). The total number of values of the angle θint is obtained by multiplying the number of values of the angle $\theta int_1$ by the number of values of the angle $\theta int_2$. Accordingly, the total number of values of the angle (θint, θ, ϕ) is 1092 (=12×7×(13×13)). Since the units of each speaker are generally combined symmetrically, the inter-unit angles θint1 and θint2 can be regarded as equal to one another in the calculation, and thus the total number of values of the angle (θint, θ, ϕ) is calculated such that 12×7×13=1092.

Then, the positions of the axis points are calculated as shown in FIG. 7B. Specifically, positions of the axis points 17B, 17C, and 17D, at which the sound receiving surface intersects the axis lines 17E, 17F, and 17G corresponding to the directions of the units of the speaker as described above, are calculated from the angles (θint, θ, ϕ) and the space shape 11F set as shown in FIG. 4. Namely, the process of FIG. 7B provides a sound pressure level variation degree calculator that performs, for each of the set mounting angle patterns, an axis point position calculation process for calculating positions of axis points at which a sound receiving surface defined in the space intersects axis lines of the speaker units at the specific mounting angles.

Then, the frequency characteristics of the sound pressure levels of the axis points obtained as shown in FIG. 7B are optimized as shown in FIG. 7C. Here, a simple overview of the process of FIG. 7C is described, and a detailed description thereof will be given in the description of FIG. 8. The purpose of the optimization of FIG. 7C is to increase the efficiency of calculation of the indicator of FIG. 7D as described above. Put simply, the process of FIG. 7C is to obtain equalizer characteristics which make uniform the sound pressure levels of the axis points 17B, 17C, and 17D and the frequency characteristics of the sound pressure levels. For example, sound from the unit 16D also reaches the axis point 17B and sound from the unit 16B also reaches the axis point 17D since the units 16B, 16C, and 16*d* of the array speaker 16A generally have broad orientations. If the sound pressure level of the unit 16B is simply adjusted up as the sound volume of the axis point 17B seems to be low, the sound volumes of the other axis points 17C and 17D may also be increased, thereby disrupting the balance. Thus, the apparatus of this embodiment prepares a variety of patterns that are a variety of combinations of equalizer values of the units 16B, 16C, and 16D. For each pattern, frequency characteristics of sounds, which are transmitted from the units 16B, 16C, and 16D of the array speaker 16A mounted with the angle set in the process of FIG. 7A and are then received at the axis points 17B, 17C, and 17D, are calculated using the above-mentioned SP data 107 of FIG. 1, which is data of FFTed impulse responses of all angles as viewed from the speaker, and an optimal pattern is then selected based on the calculation. The process shown in FIG. 7B provides the sound pressure level variation degree calculator that performs an equalizer parameter calculation process for determining equalizer parameters of the speaker units which minimize a degree of variation among frequency characteristics of sound pressure levels at the axis points.

First, at step S171 of FIG. 7C, reference frequency bands $f_i$, which have discrete values (i=1-N), have been previously set. For example, the reference frequency bands $f_i$ can be set to any ones of 63 Hz, 125 Hz, 250 Hz, 500 Hz, 1 kHz, 2 kHz, and 8 kHz corresponding to the channels of a parametric equalizer.

At step S172 of FIG. 7C, equalizer patterns $(G1, G2, G3)_{fHz}$ for adjusting gains of the reference frequency bands are set for the units 16B, 16C, and 16D, respectively. Namely, the step S172 provides the sound pressure level variation degree calculator which performs the equalizer parameter calculation process of setting equalizer gain patterns corresponding to combinations of gain setting levels of the speaker units at each channel frequency of an equalizer used to control frequency characteristics of sound signals fed to the speaker units.

At step S173 of FIG. 7C, the frequency characteristics of the sound pressure levels of the axis points 17B, 17C, and 17D described above are calculated for the set equalizer patterns, and a pattern that minimizes the variation among the axis points 17B, 17C, and 17D in each of the reference frequency bands is selected from the patterns. More specifically, the variance of the axis points 17B, 17C, and 17D is calculated for each of the reference frequency bands and the standard deviation thereof for each reference frequency band is calculated by taking the square root of the absolute value of the calculated variance. The standard deviation of a specific frequency indicates the degree of variation between the gains of the specific frequency. The lower the standard deviation is, the lower the degree of variation is. Accordingly, as a pattern provides a smaller standard deviation, the pattern is more suitable.

The optimal patterns $(G1, G2, G3)_{fiHz}$ are selected independently for each frequency. Equalizer parameters of the units 16B, 16C, and 16D are determined through these steps. Namely, the step S173 provides the sound pressure level variation degree calculator which performs the equalizer parameter calculation process of calculating, independently for each channel frequency, the equalizer parameters of the speaker units by selecting one equalizer gain pattern from among the set equalizer gain patterns, the selected equalizer gain pattern minimizing a degree of variation of the gains at the respective axis points of the speaker units.

Although the patterns are selected for each frequency in the step of determining parameters as described above, data of the determined equalizer parameters is stored in the external storage device 104 or the like for each of the units 16B, 16C, and 16D rather than each frequency in order to set the parameters in the parametric equalizer.

Although not illustrated, optimization of the sound pressure levels is also performed based on the SP data 107 at the steps shown in FIG. 7C.

The equalizer parameters calculated as shown in FIG. 7C are FFTed and stored as equalizer data 108 in the external storage device 104. This ensures that the simulation parameters can be calculated simply through a convolution-based calculation in the frequency domain at the simulation parameter calculation step ST2 shown in FIG. 2, thereby quickly outputting the calculation results. As described above, acoustic design support apparatuses mostly perform optimization design by repeating simulations with repeatedly changed conditions. FFTed data of the equalizer parameters is efficient for such devices.

In FIG. 7D, the standard deviation of sound pressure levels in the sound receiving surface area is calculated based on the equalizer parameters of the units 16B, 16C, and 16D obtained in FIG. 7C, and the sound pressure levels and the frequency characteristics thereof in the sound receiving surface area are calculated. To accomplish this, steps S175-S177 are performed. The following is a description of the steps of FIG. 7D.

At step S175 of FIG. 7D, for example, lattice points 17J as shown in FIG. 9 are set in the sound receiving surface area. The lattice points 17J are used to represent all positions in the sound receiving surface area. Once the lattice points 17J are set, Fourier transformed time delay phase correction filter data 107C and Fourier transformed distance attenuation correction filter data 107D are calculated and stored in the external storage device 104.

At step S176 of FIG. 7D, respective sound pressure levels of the lattice points 17J are calculated through a convolution-based calculation of the SP data 107 (107B-107D in FIG. 1) of each speaker unit.

Specifically, for each speaker unit, the sound pressure levels are calculated in the frequency domain through convolution of all of the Fourier transformed time delay phase correction filter data 107C, the Fourier transformed distance attenuation correction filter data 107D, the Fourier transformed equalizer data 108, and the SP data 107B of the corresponding direction.

As described above, the SP data 107B of the corresponding direction is read from the SP data 107A of all directions that have been previously produced through FFT of data of the impulse responses of the angles as viewed from the speaker and then been stored as parameters of the frequency characteristics. The data 107C, 107D, and 108 is manually or automatically set in the simulation process.

Thus, it is possible to calculate sound pressure levels and frequency characteristics of sounds, which are transmitted from the units 16B, 16C, and 16D and are then received at the positions of the lattice points 17J. It is also possible to calculate impulse responses at the lattice points 17J. The apparatus of this embodiment defines reference frequencies and calculates the sound pressure levels by adding up the squares of gains at the reference frequencies calculated from the above-mentioned frequency characteristics. That is, the sum of the squares of gains at the reference frequencies is used as a substitute for the sound pressure level. The gains at the reference frequencies are obtained by convolving, in the frequency domain, the equalizer parameters of the units 16B, 16C, and 16D obtained in FIG. 7C and the corrected SP data 107 and then by superimposing outputs of the units 16B, 16C, and 16D. Data obtained by adding up squares of the values of the frequency characteristics of the reference frequencies at each position of the lattice points 17J or data obtained by adding up weighted squares thereof is stored as values indicating the sound pressure levels as described above. Although these reference frequency bands are not necessarily equal to those of FIG. 7C, they can be set to any ones of, for example, 63 Hz, 125 Hz, 250 Hz, 500 Hz, 1 kHz, 2 kHz, and 8 kHz.

As described above, the step S176 provides an acoustic parameter calculator that calculates a variety of acoustic parameters at sound receiving points within the space based on both of the shape information of the space and the optimal mounting direction of the speaker. In detail, the acoustic parameter calculator calculates the acoustic parameters from a response at each sound receiving point. The response is obtained by a convolution-based calculation of speaker characteristics data, equalizer characteristics data and filter characteristics data in a frequency domain. The speaker characteristics data is previously produced through Fourier transform of data of actually measured values of impulse responses in all directions of the speaker, the equalizer characteristics data is previously produced through Fourier transform of data of an equalizer used to adjust frequency characteristics of the speaker, and the filter characteristics data is previously produced through Fourier transform of filter data for phase correction due to a time delay and filter data for attenuation correction due to an attenuation, the time delay and the attenuation being caused by a distance between the sound receiving point and a sound source point defined in the space. The acoustic parameter calculator calculates the acoustic parameters which represent at least one of characteristics of sound pressure levels of the sound receiving surface, a distribution of the sound pressure levels along the sound receiving surface, and impulse responses of the sound receiving surface.

The variance $\sigma^2$ of the sound pressure levels at the positions of the lattice points 17J obtained at step S176 is obtained at step S177 of FIG. 7D. The standard deviation $\sigma$ of the entire sound receiving surface is calculated by calculating the square root of the variance $\sigma^2$. The standard deviation of a specific frequency indicates the degree of variation between the gains of the specific frequency. The lower the standard deviation is, the lower the degree of variation between the points of the sound receiving surface is and the more desirable the standard deviation is. Namely, the step S177 provides the sound pressure level variation degree calculator that performs, for each of the set mounting angle patterns, a sound pressure level variation degree calculation process for obtaining a degree of variation among the sound pressure levels at a plurality of positions previously set on the sound receiving surface based on the determined equalizer parameters and frequency characteristics of each speaker unit.

In the process of FIG. 7E, the horizontal and vertical angles ($\theta$i, $\phi$i) of the units 16B, 16C, and 16C of the array speaker 16A (see FIG. 5) are reset to different angles and the processes of FIG. 7A-7D are repeated. Accordingly, an angle setting pattern, which minimizes the standard deviation obtained through the procedure of FIG. 7D, is selected. In this example, in order to reduce the calculation time, the angles of the mounted array speaker are searched for by initially setting the angle increment to a large angle and then decreasing the set angle increment as described above. This process will be described in detail later with reference to FIG. 10. The process of FIG. 7E provides a pattern setter that sets a plurality of mounting angle patterns, each mounting angle pattern corresponding to a combination of specific mounting angles of the speaker units.

As described above with reference to FIG. 7, optimal angles of the array speaker 16A and inter-unit angles thereof are calculated by setting the angle pattern as shown in FIG. 7A and calculating the standard deviation of sound pressure levels in the sound receiving surface area as shown in FIG. 7D, which is an indicator of the degree of variation between the sound pressures. However, first, equalizer characteristics, which optimize the frequency characteristics of the axis points 17B, 17C, and 17D, are obtained as shown in FIG. 7C in order to increase the calculation efficiency.

Figure 8A:
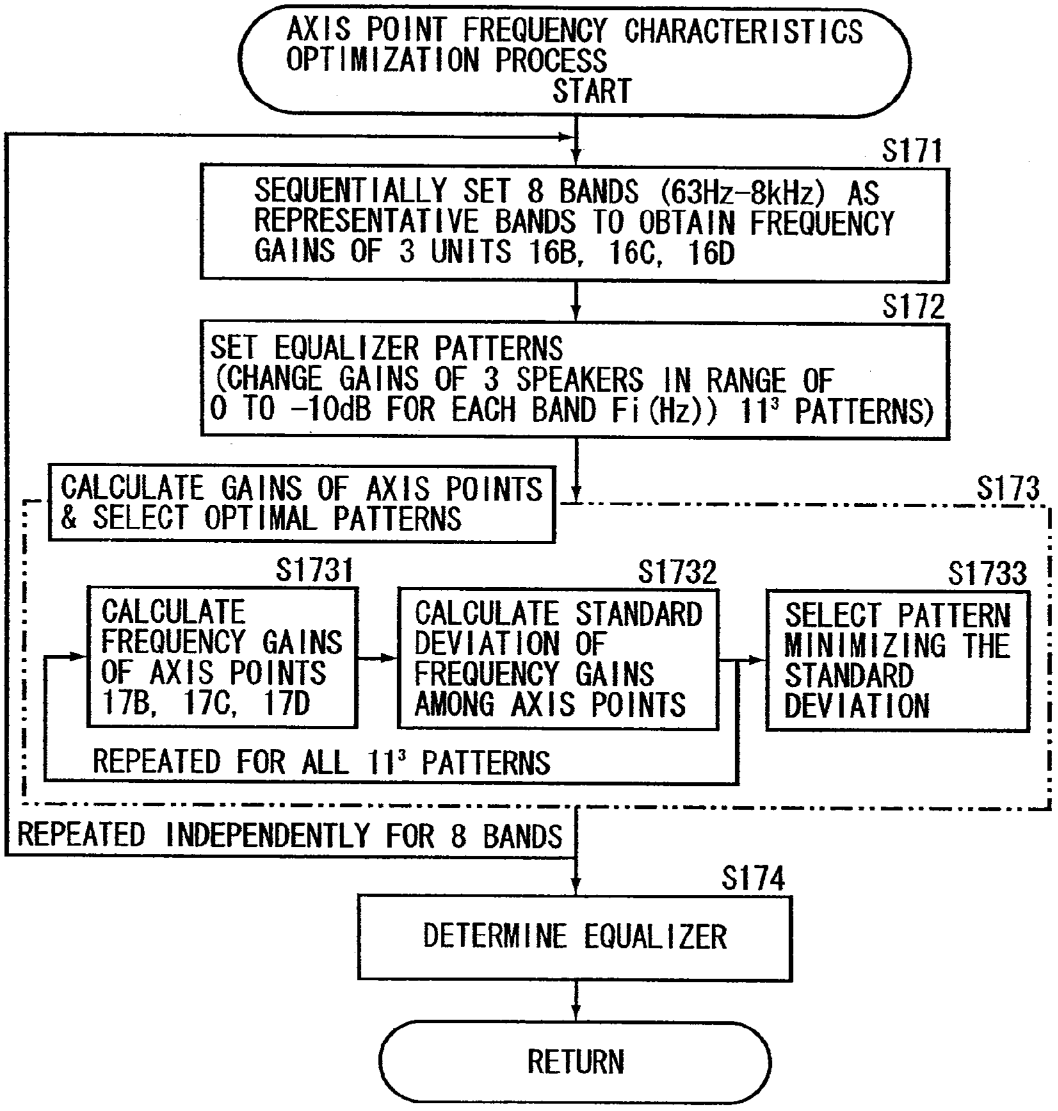
FIGS. 8A and 8B are a flow chart of optimization of the frequency characteristics of axis points shown in FIG. 7C, and a diagram illustrating an example equalizer setting used in the optimization, respectively.
Figure 8B:
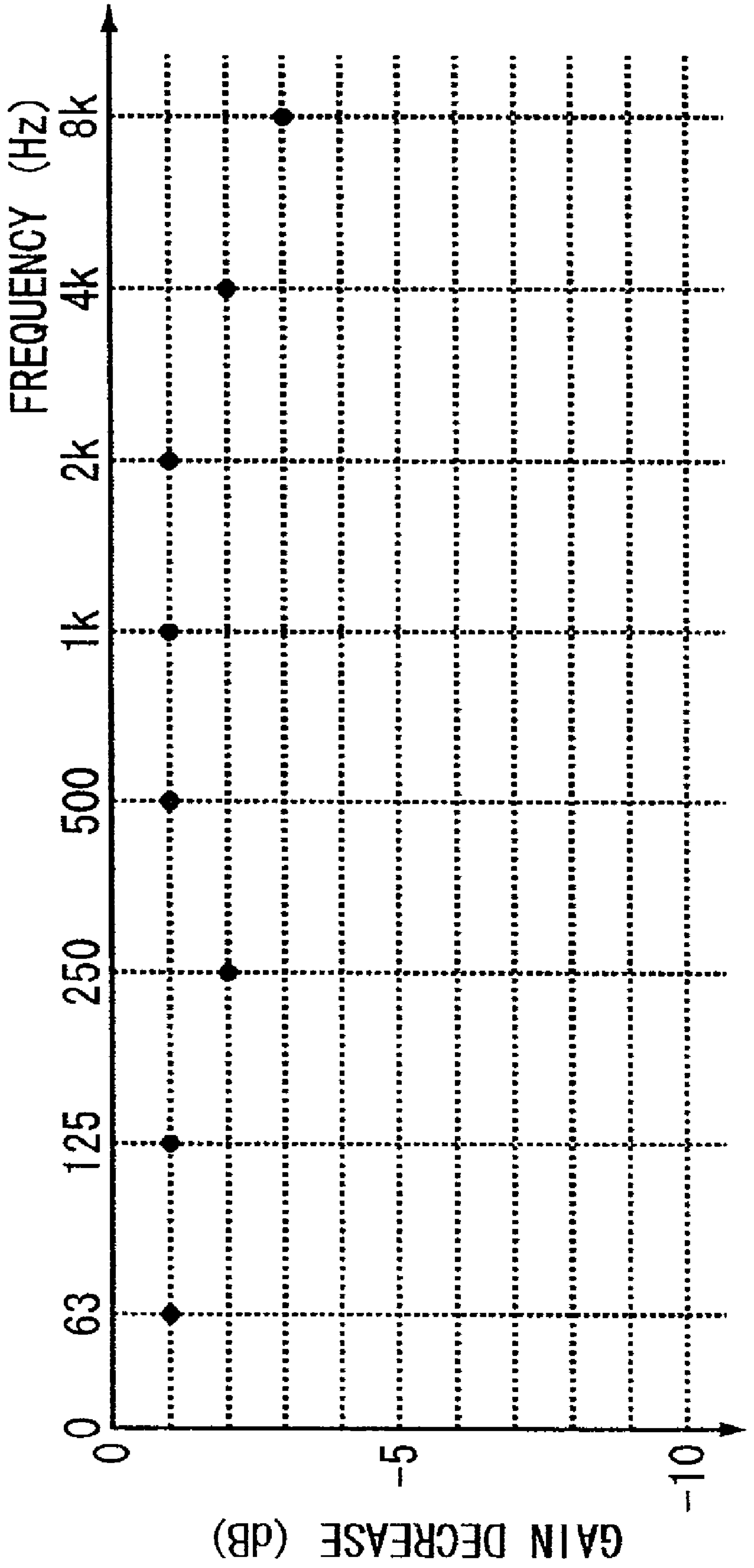

The steps shown in FIG. 7C will now be described in detail with reference to FIGS. 8A and 8B. FIGS. 8A and 8B are a flow chart of optimization of the frequency characteristics of the axis points shown in FIG. 7C and a diagram illustrating an example equalizer setting used in the optimization, respectively.

At step S171 of FIG. 8A, the reference frequency bands fi are sequentially set to 8 bands (63 Hz-8 kHz) as representative bands to obtain the frequency gains of the 3 units 16B, 16C, and 16D. The reference frequency bands correspond to central frequencies of the channels of the parametric equalizer. For example, the reference frequency bands are set to any ones of 63 Hz, 125 Hz, 250 Hz, 500 Hz, 1 kHz, 2 kHz, and 8 kHz as shown in FIG. 8B.

At step S172 of FIG. 8A, each gain of the gain setting pattern (G1, G2, G3)$_{fHz}$ described above in FIG. 7C ranges from 0 dB to −10 dB at intervals of 1 dB. Accordingly, $11^3$ patterns are set for each reference frequency (for example, 63 Hz) and therefore $8\times11^3$ patterns are set for all the reference frequencies. Equalizer data of the patterns is obtained for each unit and is stored as the equalizer data 108 which is FFTed data.

At step S173 of FIG. 8A, the gains of the axis points are calculated for each of the patterns and an optimal pattern is selected from the patterns. This step can be further divided into steps S1731-S1733.

At step S1731 of FIG. 8A, frequency characteristics (frequency gains) of sounds, which are transmitted from the array speaker 16A and are then received at the axis points 17B, 17C, and 17D as shown in FIG. 7B, are calculated based on the data 107A-107D of the SP data of FIG. 1, and data of the calculated frequency gains of the axis points is then stored for each reference frequency band $f_i$.

Specifically, for each speaker unit, the frequency gains are calculated in the frequency domain through convolution of all of the Fourier transformed time delay phase correction filter data 107C, the Fourier transformed distance attenuation correction filter data 107D, the Fourier transformed equalizer data 108, and the SP data 107B of the corresponding direction.

In the apparatus of this embodiment, the number of the stored data elements of the calculated frequency gains is 24 (3×8=24) since the number of units of the speaker is 3 and the number of reference frequency bands is 8.

At step S1732, a standard deviation of the data of the frequency gains of the three points is obtained for each reference frequency band $f_i$.

At step S1733, the calculation of the steps S1731-S1732 is repeated for all the $11^3$ patterns set at step S172 to obtain a pattern that minimizes the standard deviation of step S1732.

Through these steps S1731-S1733 of FIG. 8A, it is possible to obtain an equalizer gain of each reference frequency band, which minimizes the standard deviation of the sound levels among the axis points 17B, 17C, and 17D. Here, the equalizer gain corresponds to each point shown in FIG. 8B. This procedure is repeated for all the 8 reference frequency bands, whereby an equalizer gain pattern can be determined at step S174 of FIG. 8A. As described above with reference to FIG. 7C, this pattern is recompiled for each of the units and is then stored in the external storage device 104. Then, the process of FIG. 8A is terminated.

Figure 10:
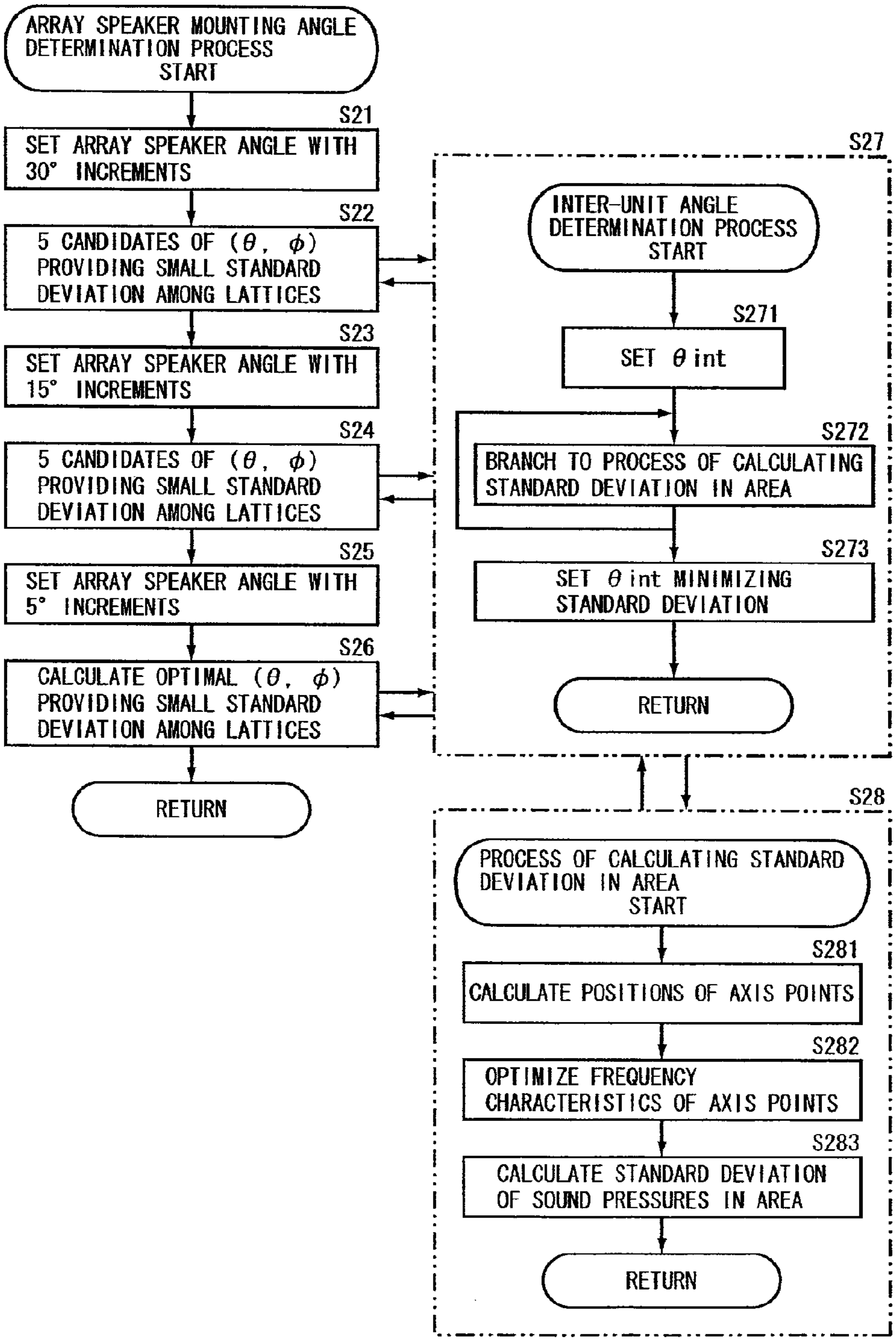
FIG. 10 is an example flow chart of a process for optimizing angles shown in FIG. 7E.

The method shown in FIGS. 7A and 7B, in which angles of the array speaker and inter-unit angles are set and searched for to determine the optimal angles, will now be described in detail with reference to FIG. 10. FIG. 10 is an example flow chart of the process for optimizing the angles.

At step S21 of FIG. 10, angle patterns (θ, ϕ) of the array speaker, each of which is a combination of horizontal and vertical angles, are set at intervals of 30 degrees and then inter-unit angle θints are set for each of the angles of the array speaker (refer to the description of FIG. 7A). For the selection of the inter-unit angles, a unique angle range and increment can be previously set for each type of the array speaker 16A as shown in FIG. 6, and a pattern is prepared by selecting it from the angle range as described above. In this example, the angle θ is set in the range of $180° < θ \leqq 180°$ at intervals of 30 degrees and the angle ϕ is set in the range of $-90° \leqq ϕ \leqq 90°$ at intervals of 30 degrees. The step S21 provides the pattern setter that sets the plurality of the mounting angle patterns at intervals of a coarse angle in a first iterative loop.

At step S22, 5 most optimal angle patterns (θ, ϕ), which minimize the standard deviation of the sound pressure levels of the lattice points (for example, 17J in FIG. 9), are selected. Here, the sum of squares of the gains at the reference frequencies is used as a substitute for the sound pressure level as described above with reference to FIG. 7D. The same is true in the following. In the angle pattern selection, there is a need to set a plurality of inter-unit angles θint and then to select an optimal inter-unit angle θint therefrom. To accomplish this, a subroutine of step S27 is performed for each pattern.

The following is a description of the subroutine of step S27 in FIG. 10. In this embodiment, the acoustic design support apparatus repeatedly activates the pattern setter, the pressure level variation degree calculator, and the pattern selector in an iterative manner. At step S271, a plurality of inter-unit angles θint is selected for each of the angle patterns (θ, ϕ) of the array speaker selected at step S22. The set inter-unit angles θint are the same as those described above with reference to FIG. 7A.

At step S272, a process for calculating a standard deviation in the area of step S28 is performed for each of the angles (θint, θ, ϕ) set at steps S22 and S271. Here, only the angle θint is changed with the angles (θ, ϕ) fixed, and the step S28 is performed for each angle θint.

Steps S281-S283 of the step S28 correspond respectively to the steps of FIGS. 7B-7D. Here, a description of steps S281-S283 is omitted and the above description of the steps of FIGS. 7B-7D is substituted therefor.

At step S273, an inter-unit angle θint, which minimizes the standard deviation, is selected from those calculated at step S272. Then, the subroutine of step S27 is stopped. However, as the set (θ, ϕ) is changed, the process of step S27 is repeated.

At step S23, the set (θ, ϕ) is changed, and 5 smallest values are selected from the smallest values calculated in the subroutine of S27.

At step S23 of FIG. 10, sets of angles at intervals of 15 degrees, which are adjacent to each of the angles of the 5 angle patterns (θ, ϕ) selected at step S22, are set. For example, if one of the 5 selected optimal angle patterns (θ, ϕ) is (30°, 45°), new patterns are set with angles θ of 15°, 30°, and 45° and angles ϕ of 30°, 45°, and 60°. Here, the number of patterns is $3^2$. The number of total patterns is $5×3^2$ when taking into consideration the 5 selected optimal angle patterns (θ, ϕ). For each of the new patterns (θ, ϕ) set in this manner, an inter-unit angle θint is set and optimized in the subroutine of step S27 as described above.

At step S24 of FIG. 10, for the newly set patterns, pattern searching is performed to select 5 pattern candidates in the same manner as at step S22.

At step S25 of FIG. 10, the angles are set at intervals of 5 degrees rather than 15 degrees in the same manner as at steps S23-S24. For example, if the angle θ of one of the 5 selected optimal angle patterns (θ, ϕ) is 45°, new patterns are set with angles θ of 40°, 45°, and 50°. Namely, the step S25 provides the pattern setter that resets a plurality of fine mounting angle patterns in a second or subsequent iterative loop at intervals of a fine angle around at least one mounting angle pattern providing a small degree of variation of the sound pressure levels among the plurality of the mounting angle patterns set in the first iterative loop.

At step S26 of FIG. 10, a pattern (θint, θ, ϕ) is determined using the subroutine of step S27 for each of the angles set at step S25 in the same manner as at steps S22 and S24. At step S26, the optimal angle pattern (θ, ϕ) rather than 5 most optimal angle patterns is selected in a different manner from steps S22 and S24, and the pattern (θint, θ, ϕ) is finally determined. Namely, the step S26 provides a pattern selector that selects one of the set mounting angle patterns, which minimizes the degree of variation of the sound pressure levels at the plurality of the positions, as an optimal mounting angle pattern which determines the mounting angles of the speaker units of the array speaker. More concretely, the pattern selector selects one of the fine mounting angle patterns providing a minimum degree of variation of the sound pressure levels from among the plurality of the fine mounting angle patterns reset in the second or subsequent iterative loop, as an optimal mounting angle pattern of the speaker units of the array speaker.

As described above with reference to FIG. 10, initially, the angle range is searched coarsely and is then searched finely, thereby reducing the search time. This search method prevents failure of calculation due to calculation costs.

Figure 11:
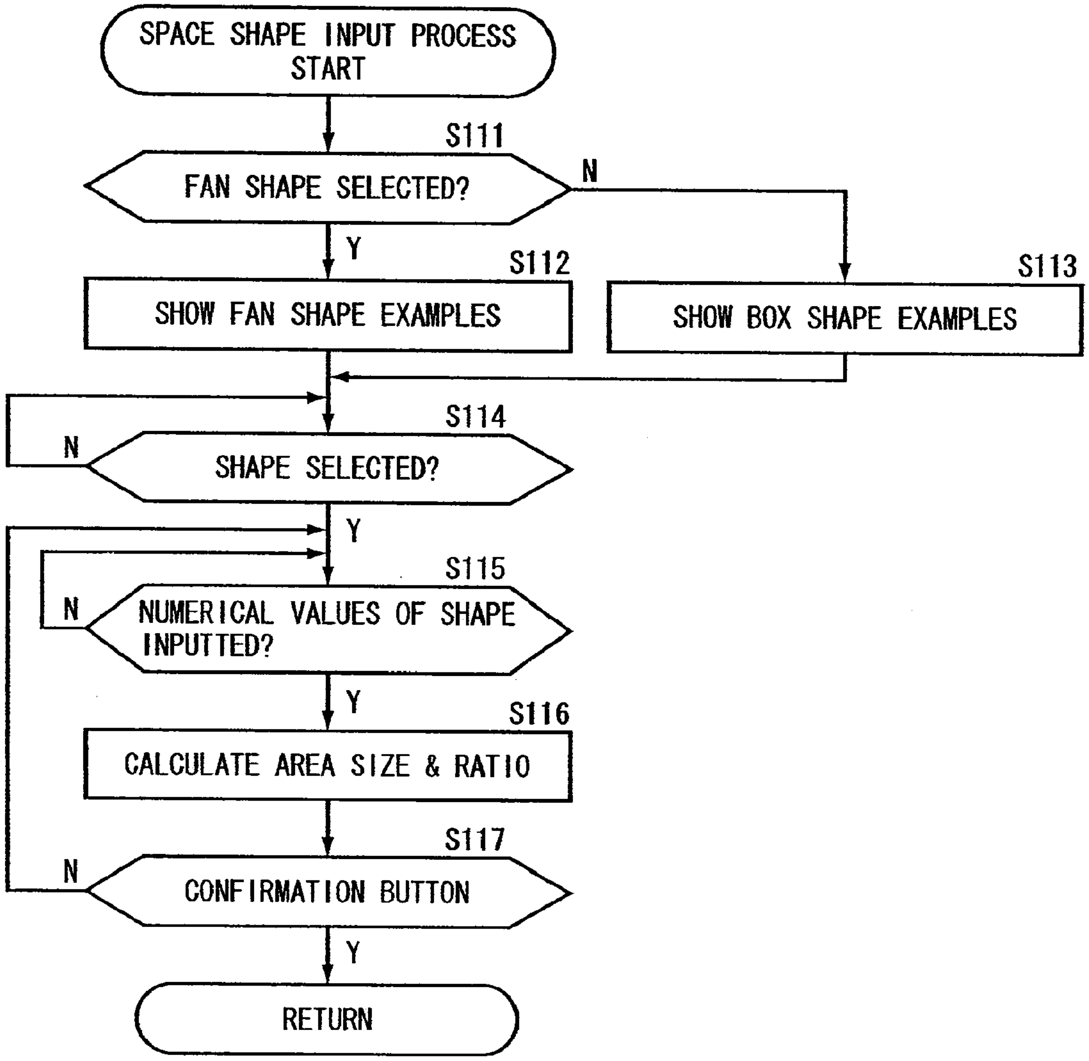
FIG. 11 is an example flow chart of a process for inputting a space shape through a GUI illustrated in FIGS. 3 and 4.

A process for inputting a space shape through the GUI illustrated in FIGS. 3 and 4 will now be described with reference to FIG. 11. FIG. 11 is an example flow chart of the process for inputting the space shape. This process corresponds to the space shape setting step S11 of FIG. 2.

At step S111 of FIG. 11, it is determined whether a fan shape or a box shape has been selected through the shape selection portion 11C shown in FIG. 3. If a fan shape has been selected, the determination of step S111 is Yes, and the process proceeds to step S112 of FIG. 11 to display a plurality of example fan shapes on the shape selection portion 11D shown in FIG. 3.

If a box shape has been selected, the determination of step S111 is No, and the process proceeds to step S113 to display a plurality of example box shapes on the shape selection portion 11D shown in FIG. 3.

At step S114 of FIG. 11, it is determined whether or not a shape has been selected from the shape selection portion 11D of the fan shape of step S112 or from the shape selection portion 11D of the box shape of step S113. If no shape has been selected, the determination of step S114 is No, and the process waits until a shape has been selected. If a shape has been selected, the screen of the display 101 is changed and the process proceeds to the next step S115.

At step S115 of FIG. 11, it is determined whether or not all numerical values specifying a space shape have been input. If all the numerical values have not been input, the determination of step S115 is No, and the process waits until all the numerical values have been input.

At step S116 of FIG. 11, a planar area size and a planar aspect ratio of the space shape are calculated from the numerical values that have been input at step S115 to specify the space shape.

At step S117 of FIG. 11, it is determined whether or not the confirmation button of FIG. 3 has been pressed. If the confirmation button has been pressed, the process is terminated. If the confirmation button has not been pressed, the process returns to step S115 to receive different numerical values from the input numerical values.

Through the steps of the process shown in FIG. 11, a space shape can be easily set using only the acoustic design support apparatus of this embodiment without inputting CAD data. Since an exemplary acoustic facility shape is automatically determined at the above step S111, the apparatus of this embodiment can specify the space shape without inputting CAD data.

Figure 12:
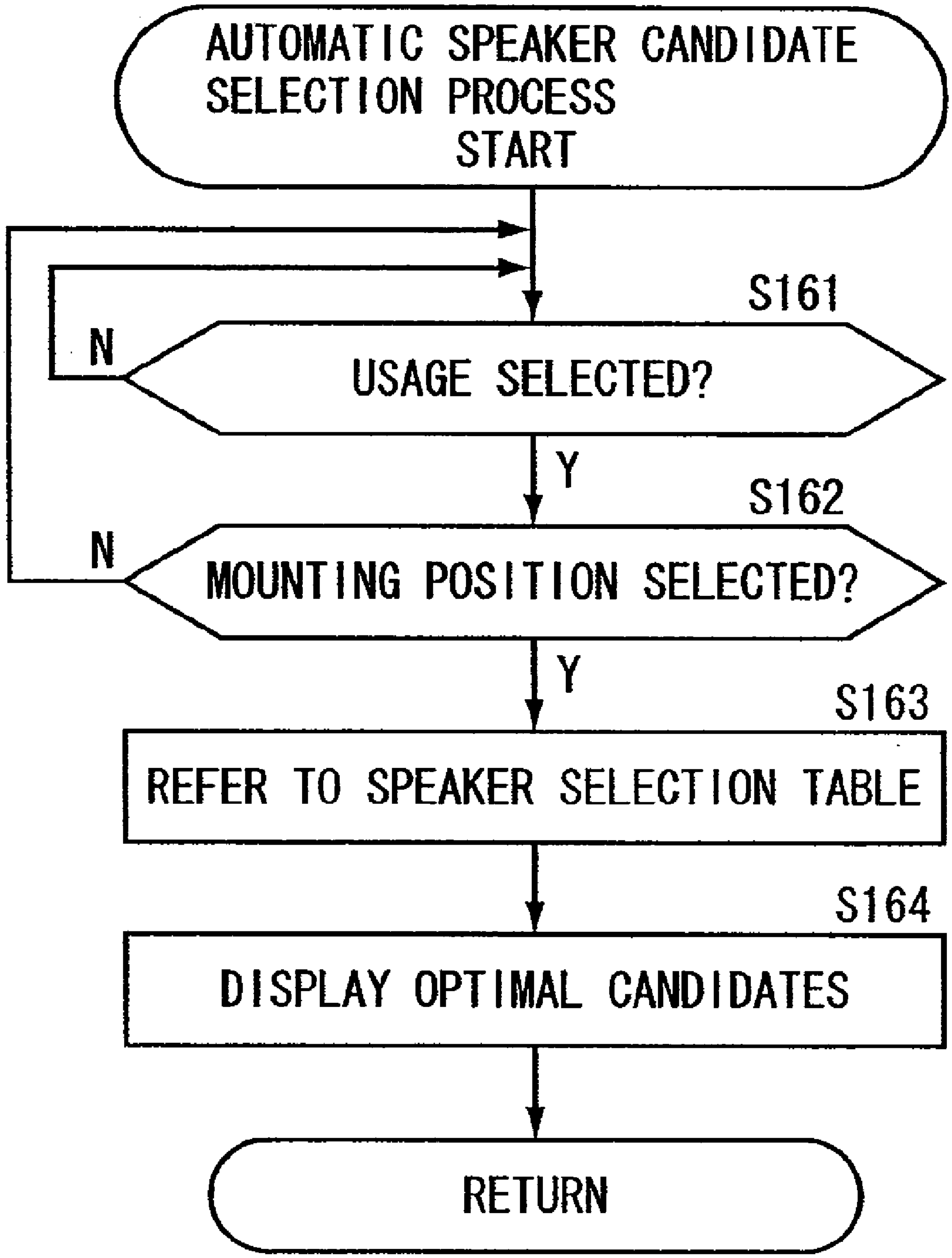
FIG. 12 is an example flow chart of a process for selecting optimal speaker candidates illustrated in FIG. 5.

A process for selecting optimal speaker candidates 16 as shown in FIG. 5 will now be described with reference to FIG. 12. FIG. 12 is an example flow chart of this process.

At step S161, it is determined whether or not a usage has been selected on the usage selection display portion 12A shown in FIG. 5, and, at step S162, it is determined whether or not a speaker mounting position has been selected on the speaker mounting position portion 12C. If no selection has been made on the usage selection display portion 12A or the speaker mounting position 12C, the determination of step S161 or 162 is No, and the process waits for the selection. If a selection has been made at both the steps S161 and S162, the process proceeds to step S163.

At step S163 of FIG. 12, reference is made to the speaker selection table 109 shown in FIG. 6 read from the external storage device 104 or the memory 105 of FIG. 1. Here, the data input at steps S161 and S162 is compared with the usage 109C and the mounting position 109D shown in FIG. 6 to determine whether or not the input data satisfies conditions in the speaker selection table 109. In addition, the area size and the aspect ratio (or horizontal to vertical ratio) calculated at step S116 of the process of FIG. 11 are compared with the data of the surface size 109B and the aspect ratio 109E shown in FIG. 6 to determine whether or not the calculated values satisfy the conditions of the speaker selection table 109.

At step S164, speakers that satisfy the conditions of the speaker selection table 109 are selected and the selected speakers are displayed as optimal speaker candidates 16 on the display 101 as shown in FIG. 5.

As described above with reference to FIG. 12, the data set for the space shape as described above with reference to FIG. 11 is compared with that of the speaker selection table 109, thereby making it possible to select optimal speaker candidates. Stated otherwise, the steps S163 and S164 provide the speaker selection supporter which calculates an area size and a planar shape aspect ratio of the space based on the shape information and the numerical information inputted through the space shape input unit, and determines whether or not the calculated area size and planar shape aspect ratio correspond to the allowable range of the area size of the space for each speaker and the allowable range of the planar shape aspect ratio of the space for each speaker so as to select the speaker which meets the allowable ranges.

The condition setting and automatic optimization/support method described above with reference to FIGS. 3-12 makes it possible to substantially automate the condition setting that has been conventionally optimized by trial and error. The simulation parameter calculation step ST2 of FIG. 2 is performed based on the optimization results, and, at the result output step ST3, a sound pressure distribution can be displayed to show the optimization results and a sound field can be confirmed through a headphone.

The numerical values described with reference to FIGS. 1-12, the number of units, the fan or rectangular shape of FIG. 3, and GUIs of FIGS. 4-6 are only examples of the embodiment for easier explanation, without limiting the present invention. The processes shown in the flow charts are also examples of the embodiment. Particularly, the condition and pattern setting steps have been described above as a part of the repetitive process for easier explanation. However, if the setting is done once, there is no need to repeat the setting during the repetitive routine.

The invention clamed is:

1. An acoustic design support apparatus comprising:

a speaker selection supporter that selects a desired array speaker including a plurality of speaker units as a candidate for use in a given space based on shape information representing a shape of the space;

a speaker mounting angle optimizer that calculates an optimal mounting direction of each speaker unit of the selected array speaker by selecting a mounting direction pattern which minimizes a degree of variation among sound pressure levels at a plurality of positions on a sound receiving surface defined in the space; and an acoustic parameter calculator that calculates a variety of acoustic parameters at sound receiving points within the space based on both of the shape information of the space and the optimal mounting direction of each speaker unit, wherein the acoustic parameter calculator calculates the sound pressure level at each sound receiving point as one of a variety of acoustic parameters in a frequency domain through convolution operation of all of Fourier transformed time delay phase correction filter data, Fourier transformed distance attenuation correction filter data, Fourier transformed equalizer data, and impulse response data of a corresponding direction that is produced through Fast Fourier Transform of an impulse response of surroundings of the selected array speaker.

* * * * *